(12) United States Patent
Shin et al.

(10) Patent No.: US 11,188,458 B2
(45) Date of Patent: Nov. 30, 2021

(54) MEMORY CONTROLLER AND METHOD OF OPERATING THE SAME

(71) Applicant: SK hynix Inc., Icheon-si (KR)

(72) Inventors: Hee Chan Shin, Yongin-si (KR); Yong Seok Oh, Yongin-si (KR); Ju Hyun Kim, Suwon-si (KR); Jin Yeong Kim, Yongin-si (KR)

(73) Assignee: SK hynix Inc., Icheon-si (KR)

( * ) Notice: Subject to any disclaimer, the term of this patent is extended or adjusted under 35 U.S.C. 154(b) by 16 days.

(21) Appl. No.: 16/702,508

(22) Filed: Dec. 3, 2019

(65) Prior Publication Data

US 2021/0034512 A1 Feb. 4, 2021

(30) Foreign Application Priority Data

Jul. 30, 2019 (KR) .................. 10-2019-0092465

(51) Int. Cl.
*G06F 12/02* (2006.01)
*G06F 3/06* (2006.01)

(52) U.S. Cl.
CPC ........ *G06F 12/0246* (2013.01); *G06F 3/0604* (2013.01); *G06F 3/0647* (2013.01); *G06F 3/0653* (2013.01); *G06F 3/0656* (2013.01); *G06F 3/0659* (2013.01); *G06F 3/0679* (2013.01); *G06F 3/0683* (2013.01); *G06F 12/0253* (2013.01); *G06F 2212/7205* (2013.01)

(58) Field of Classification Search
CPC ............. G06F 12/0246; G06F 12/0253; G06F 3/0679; G06F 3/0604; G06F 3/0659; G06F 3/0647; G06F 3/0683; G06F 3/0653; G06F 3/0656; G06F 2212/7205
See application file for complete search history.

(56) References Cited

U.S. PATENT DOCUMENTS

| | | | |
|---|---|---|---|
| 2014/0359226 A1* | 12/2014 | Pan ...................... | G06F 12/0873 711/135 |
| 2015/0347029 A1* | 12/2015 | Kotte .................... | G06F 3/0688 711/103 |
| 2016/0179399 A1* | 6/2016 | Melik-Martirosian | ...................... G06F 3/0653 711/103 |
| 2016/0283125 A1* | 9/2016 | Hashimoto ........... | G06F 16/166 |
| 2019/0073297 A1* | 3/2019 | Goss ..................... | G06F 3/0679 |
| 2020/0401513 A1* | 12/2020 | He ....................... | G06F 12/0253 |

FOREIGN PATENT DOCUMENTS

| KR | 1020170024529 A | 3/2017 |
|---|---|---|
| KR | 10-1881089 B1 | 7/2018 |

* cited by examiner

*Primary Examiner* — Kalpit Parikh

(57) ABSTRACT

The memory controller controls at least one memory device including a plurality of stream storage areas. The memory controller comprises a buffer, a write history manager, a write controller, and a garbage collection controller. The buffer stores write data. The write history manager stores write count values for each of the plurality of stream storage areas and generates write history information indicating a write operation frequency for each of the plurality of stream storage areas based on the write count values. The write controller controls the at least one memory device to store the write data provided from the buffer. The garbage collection controller controls the at least one memory device to perform a garbage collection operation on a target stream storage area selected from among the plurality of stream storage areas based on the write history information.

20 Claims, 16 Drawing Sheets

WRITE COUNT INFORMATION STORAGE

| Index | Stream 1 | Stream 2 | Stream 3 |
|-------|----------|----------|----------|
| 1 | 50 | 0 | 50 |
| 2 | 40 | 0 | 60 |
| 3 | 50 | 0 | 30 |
| 4 | 10 | 0 | 90 |

← WRITE COUNT INFORMATION

Wrap Around
Index 1, 2, 4 – Complete
Index 3 – Incomplete

| Stream 1 | Stream 2 | Stream 3 |
|----------|----------|----------|
| 100 | 0 | 200 |

← WRITE HISTORY INFORMATION

| INVALID PAGE COUNT (IPC) | FIRST STREAM STORAGE AREA | SECOND STREAM STORAGE AREA |
|---|---|---|
| BEFORE CORRECTION (IPC) | 100 | 95 |
| AFTER CORRECTION (IPC+a*TotWC) | 100+0.5*40=120 | 95+0.5*60=125 |

WRITE HISTORY INFORMATION

| Stream 1 | Stream 2 |
|---|---|
| 40 | 60 |

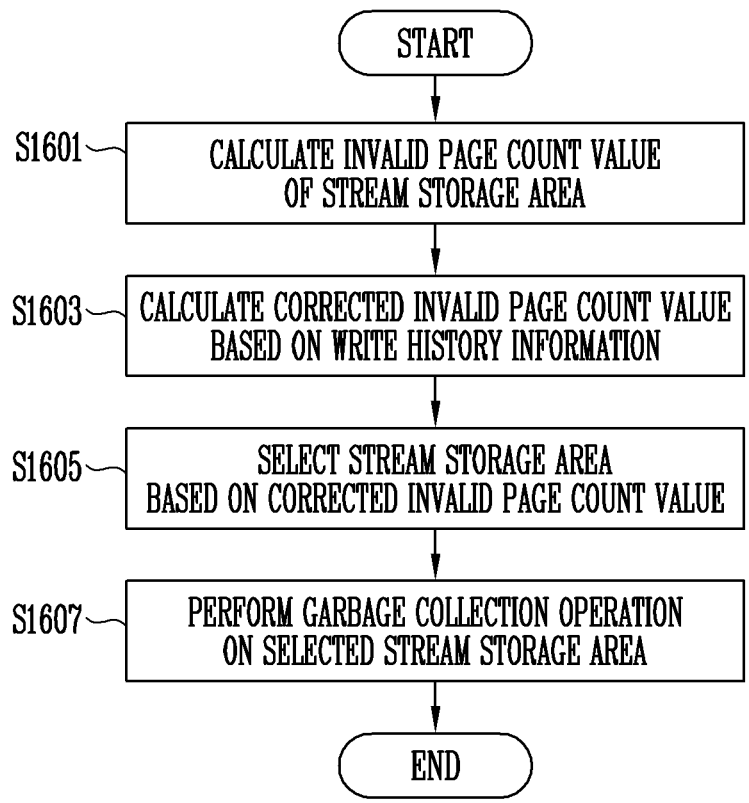
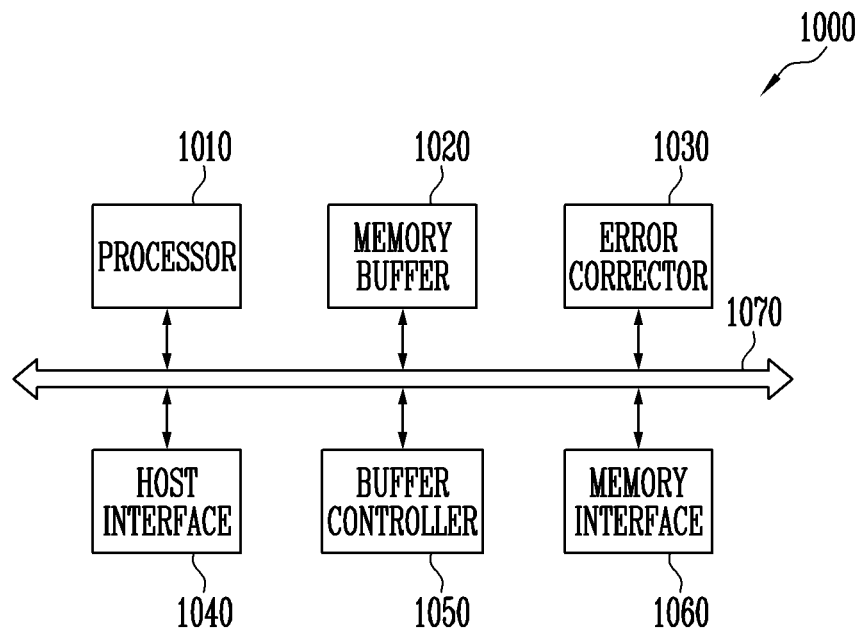

MEMORY CONTROLLER AND METHOD OF OPERATING THE SAME

CROSS-REFERENCE TO RELATED APPLICATION

The present application claims priority under 35 U.S.C. § 119(a) to Korean Patent Application Number 10-2019-0092465 filed on Jul. 30, 2019 in the Korean Intellectual Property Office, the entire disclosure of which is incorporated herein by reference.

BACKGROUND

1. Field of Invention

The present disclosure relates to an electronic device, and more particularly, to a memory controller and a method of operating the same.

2. Description of Related Art

A storage device is a device that stores data under control of a host device such as a computer or a smartphone. A storage device may include a memory device in which data is stored and a memory controller controlling the memory device. A memory device may be a volatile memory device or a non-volatile memory device.

A volatile memory device is a device that stores data only when power is supplied, and in which data cannot be retrieved when the power supply is cut off or interrupted. Non-limiting examples of volatile memory devices include a static random access memory (SRAM), a dynamic random access memory (DRAM), and the like.

A non-volatile memory device is a device from which data can be retrieved after the power supply is cut off or interrupted. Non-limiting examples of non-volatile memory devices include a read only memory (ROM), a programmable ROM (PROM), an electrically programmable ROM (EPROM), an electrically erasable and programmable ROM (EEPROM), a flash memory, and the like.

SUMMARY

An embodiment of the present disclosure provides a memory controller having an improved write resource management performance and a method of operating the same.

According to an embodiment of the present disclosure, a memory controller controls at least one memory device including a plurality of stream storage areas. The memory controller includes a buffer, a write history manager, a write controller, and a garbage collection controller. The buffer stores write data. The write history manager stores write count values for each of the plurality of stream storage areas and generates write history information indicating a write operation frequency for each of the plurality of stream storage areas based on the write count values. The write controller controls the at least one memory device to store the write data provided from the buffer. The garbage collection controller controls the at least one memory device to perform a garbage collection operation on a target stream storage area selected from among the plurality of stream storage areas based on the write history information.

According to an embodiment of the present disclosure, a method of operating a memory controller, which controls at least one memory device including a plurality of stream storage areas, the method comprising: storing a plurality of write count values for each of the plurality of stream storage areas in a set period; generating write history information indicating a write operation frequency for each of the plurality of stream storage areas based on the plurality of write count values; and controlling the at least one memory device to perform a garbage collection operation on a target stream storage area selected from among the plurality of stream storage areas based on the write history information.

According to the present technology, a memory controller having improved write resource management performance and a method of operating the same are provided.

BRIEF DESCRIPTION OF THE DRAWINGS

FIG. 16 is a flowchart illustrating an operation of a memory controller according to an embodiment of FIG. 14.

FIG. 17 is a diagram illustrating another embodiment of a memory controller of FIG. 1.

DETAILED DESCRIPTION

Hereinafter, embodiments of the present disclosure will be described in detail with reference to the accompanying drawings.

Figure 1:
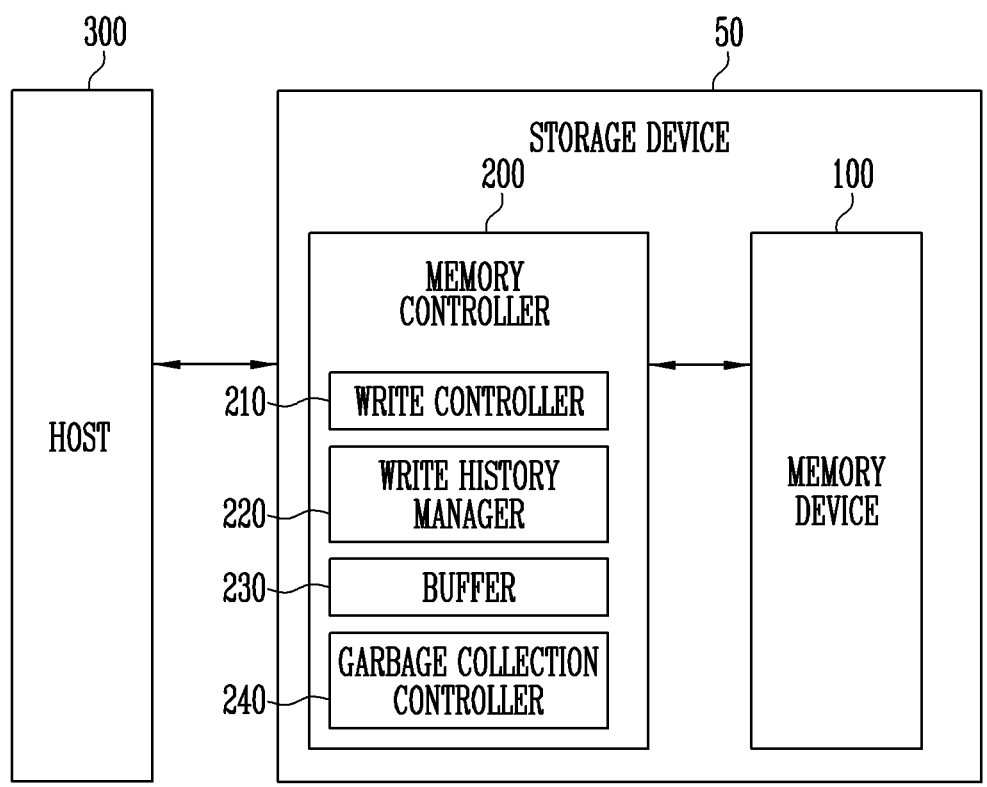
FIG. 1 is a diagram illustrating a storage device according to an embodiment of the present disclosure.

FIG. 1 is a diagram illustrating a storage device according to an embodiment of the present disclosure.

Referring to FIG. 1, the storage device 50 may include a memory device 100 and a memory controller 200 controlling an operation of the memory device 100. The storage device 50 may be a device that stores data under control of a host 300 such as for example a cellular phone, a smartphone, an MP3 player, a laptop computer, a desktop computer, a game player, a TV, a tablet PC, or an in-vehicle infotainment system.

The storage device 50 may be manufactured as one of various types of storage devices according to a host interface that is a communication method or scheme with the host 300. For example, the storage device 50 may be configured or implemented as any one of various types of storage devices such as for example a Solid State Drive (SSD), Multi-Media Card (MMC), an Embedded MMC (eMMC), an Reduced Size MMC (RS-MMC), a micro-MMC, a Secure Digital (SD) card, a mini-SD card, a micro-SD card, an Universal Serial Bus (USB) storage device, an Universal Flash Storage (UFS) device, a Personal Computer Memory Card International Association (PCMCIA) card type storage device, a Peripheral Component Interconnection (PCI) card type storage device, a PCI express (PCI-E) card type storage device, a Compact Flash (CF) card, a Smart Media Card (SMC), and a memory stick.

The storage device 50 may be manufactured as any one of various types of packages such as a Package-On-Package (POP), a System-In-Package (SIP), a System-On-Chip (SOC), a Multi-Chip package (MCP), a Chip-On-Board (COB), a Wafer-level Fabricated Package (WFP), and a Wafer-level Stack Package (WSP).

The memory device 100 may store data. The memory device 100 operates in response to or under the control of the memory controller 200. In an example, the memory device 100 may include a memory cell array including a plurality of memory cells storing the data.

Each of the plurality of memory cells may be configured as a Single Level Cell (SLC) that stores one data bit, a Multi-Level Cell (MLC) that stores two data bits, a Triple Level Cell (TLC) that stores three data bits, or a Quad Level Cell (QLC) that stores four data bits.

In another example, a memory cell array may include a plurality of memory blocks. Each of the plurality of memory blocks may include a plurality of memory cells. One memory block may include a plurality of pages. In an embodiment, a page may be a unit for storing data in the memory device 100 or reading data stored in the memory device 100.

The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SDRAM, a Low Power DDR (LPDDR), a Rambus Dynamic Random Access Memory (RDRAM), a NAND flash memory, a vertical NAND flash memory, a NOR flash memory device, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In the present specification, for convenience of description, it is assumed that the memory device 100 is a NAND flash memory.

The memory device 100 is configured to receive a command and an address from the memory controller 200 and access an area selected by the address in the memory cell array. That is, the memory device 100 may perform an operation instructed by the command on the area selected by the address. For example, the memory device 100 may perform a write operation (program operation), a read operation, and an erase operation. During a program operation, the memory device 100 may program data to the area selected by the address. During a read operation, the memory device 100 may read data from the area selected by the address. During an erase operation, the memory device 100 may erase data stored in the area selected by the address.

In an embodiment, the memory device 100, under control of the memory controller 200, may allocate a plurality of stream storage areas. Each stream storage area may include a plurality of memory blocks. Under the control of the memory controller 200, the memory device 100 may store write data provided by the host 300 together with a stream identifier in a stream storage area corresponding to the stream identifier.

The memory controller 200 controls overall operations of the storage device 50.

When power is applied to the storage device 50, the memory controller 200 may execute firmware FW. When the memory device 100 is a flash memory device, the memory controller 200 may operate firmware such as a flash translation layer (FTL) for controlling communication between the host 300 and the memory device 100.

In an embodiment, the memory controller 200 may receive data and a logical block address (LBA) from the host 300, and convert or translate the logical block address (LBA) into a physical block address (PBA) indicating an address of memory cells in the memory device 100 in which data is to be stored.

The memory controller 200 may control the memory device 100 to perform a program operation, a read operation, or an erase operation in response to a request from the host 300. During a program operation, the memory controller 200 may provide a program command, a physical block address, and data to the memory device 100. During a read operation, the memory controller 200 may provide a read command and a physical block address to the memory device 100. During an erase operation, the memory controller 200 may provide an erase command and a physical block address to the memory device 100.

In an embodiment, the memory controller 200 may generate and transmit a command, an address, and data to the memory device 100 in the absence of a request from the host 300. For example, the memory controller 200 may provide a command, an address, and data to the memory device 100 to perform background operations such as a program operation for wear leveling or a program operation for garbage collection.

In an embodiment, the memory controller 200 may control at least two memory devices 100. The memory controller 200 may control the memory devices 100 according to an interleaving method or scheme to improve operation performance. The interleaving method may be an operation method or scheme for overlapping or alternating operation periods of at least two memory devices 100.

In an embodiment, the memory controller 200 may include a write controller 210, a write history manager 220, a buffer 230, and a garbage collection controller 240.

The write controller 210 may control the buffer 230 and the memory device 100 to store write data, stored in the buffer 230, in the memory device 100.

When the write controller 210 receives a setting request for a stream from the host 300, the write controller 210 may control the buffer 230 to allocate a stream buffer area corresponding to the requested stream. The write controller 210 may control the memory device 100 to allocate a stream storage area corresponding to the requested stream. The write controller 210 may receive a stream identifier and write data for a specific stream from the host 300. The write controller 210 may control the memory device 100 to store the write data in a stream storage area corresponding to a specific stream of the memory device 100. At this time, the stream buffer area corresponding to the specific stream may be used as a buffer memory for a write operation of storing the write data in the stream storage area.

When the write controller 210 receives a release request for a specific stream from the host 300, the write controller 210 may control the buffer 230 to release the stream buffer area corresponding to the specific stream.

The write controller 210 may control a size of the stream buffer area allocated to the buffer 230, based on the write history information provided from the write history manager 220.

Specifically, the write controller 210 may calculate a write resource of each stream buffer area, based on a write operation frequency of each of a plurality of stream storage areas included in the write history information. The write controller 210 may reduce the size of the stream buffer area having more write resources and increase the size of the stream buffer area having less write resources according to the calculated write resource.

The write history manager 220 may count the number of write operations performed on each of the plurality of stream storage areas of the memory device 100, based on the stream identifier provided from the host 300. The write history manager 220 may store write count values of each of the plurality of stream storage areas. The write history manager 220 may generate write history information indicating a write operation frequency of each of the plurality of stream storage areas, based on the write count values.

The buffer 230 may store the write data provided from the host 300. The write data stored in the buffer 230 may be stored in the memory device 100.

The buffer 230 may be allocated to a plurality of stream buffer areas under control of the write controller 210. The stream buffer area may include a variable area and a fixed area. The stream buffer area may be initially set to have a default size. A size of the variable area of the stream buffer area may be controlled by the write controller 210.

The stream buffer area corresponding to a specific stream may store write data corresponding to a specific stream identifier provided from the host 300. The write data stored in the stream buffer area may be stored in the stream storage area of the memory device 100 corresponding to the stream buffer area. The stream buffer area may be used as a buffer memory for a write operation in which write data is stored in the stream storage area.

The garbage collection controller 240 may select a target stream storage area to perform a garbage collection operation among a plurality of stream storage areas included in the memory device 100.

The garbage collection controller 240 may calculate an invalid page count value corresponding to a stream storage area. The invalid page count value may be the number of invalid pages included in one memory block. In an embodiment, the invalid page count value corresponding to a stream storage area may be an average value of the invalid page counts of a plurality of memory blocks included in the stream storage area. In another embodiment, the invalid page count value corresponding to the stream storage area may be a highest value of the invalid page counts of the plurality of memory blocks included in the stream storage area.

The garbage collection controller 240 may calculate a corrected invalid page count value of each stream storage area, based on the write history information provided from the write history manager 220. The garbage collection controller 240 may select the target stream storage area from among a plurality of stream storage areas, based on the corrected invalid page count value of each of the plurality of stream storage areas.

The garbage collection controller 240 may control the memory device 100 to perform a garbage collection operation on the target stream storage area. The garbage collection controller 240 may control the memory device 100 to copy valid data stored in at least two victim blocks included in the target stream storage area to a free block included in the target stream storage area.

The host 300 may communicate with the storage device 50 using at least one of various communication methods or devices such as for example a Universal Serial Bus (USB), a Serial AT Attachment (SATA), a Aerial Attached SCSI (SAS), a High Speed Interchip (HSIC), a Small Computer System Interface (SCSI), a Peripheral Component Interconnection (PCI), a PCI express (PCIe), a Nonvolatile Memory express (NVMe), a Universal Flash Storage (UFS), a Secure Digital (SD) card, a Multimedia Card (MMC), an embedded MMC (eMMC), a Dual In-line Memory Module (DIMM), a Registered DIMM (RDIMM), and a Load Reduced DIMM (LRDIMM).

Figure 2:
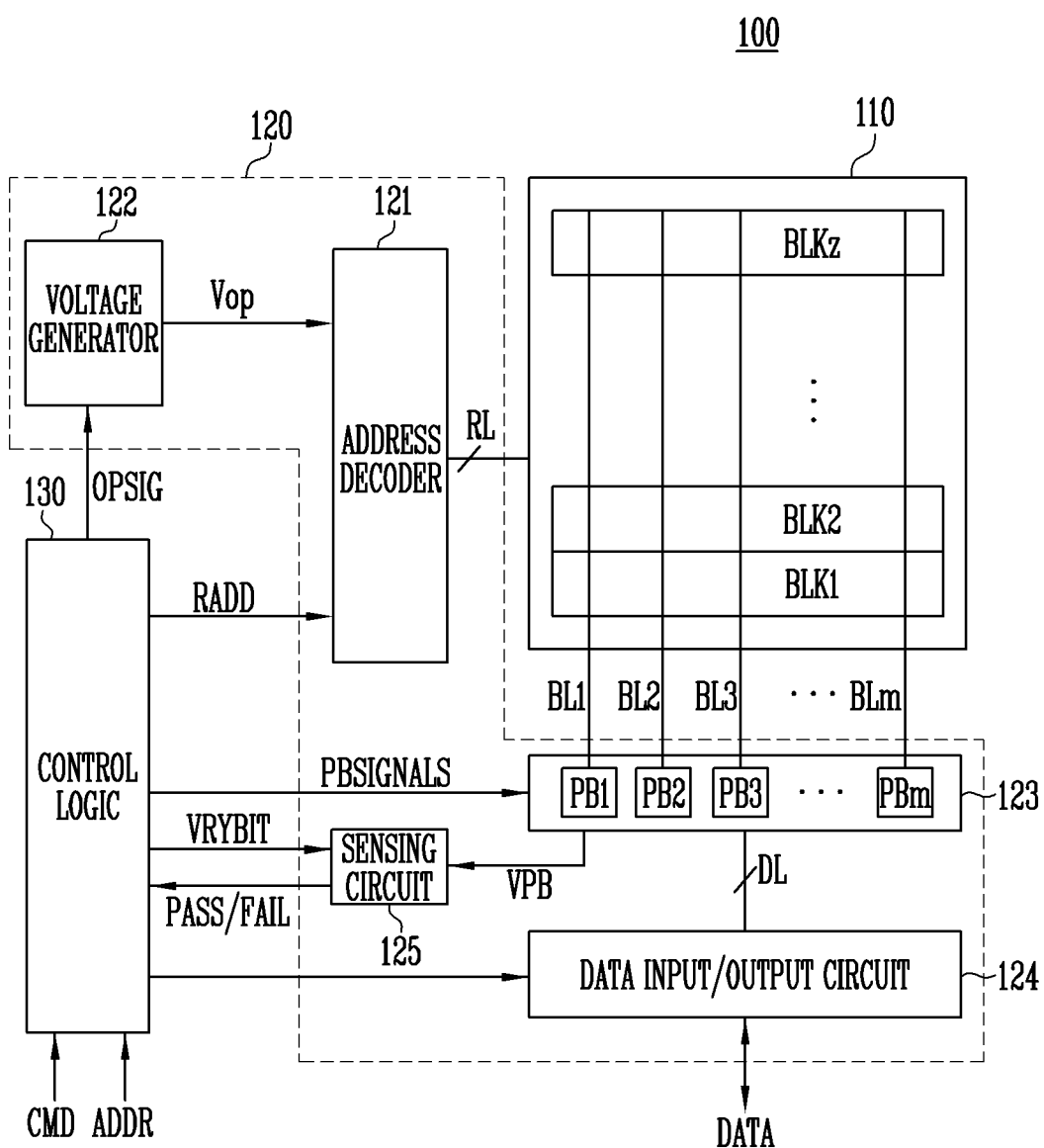
FIG. 2 is diagram illustrating a structure of a memory device of FIG. 1.

FIG. 2 is diagram illustrating a structure of a memory device of FIG. 1.

Referring to FIG. 2, a memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to an address decoder 121 through row lines RL. The plurality of memory blocks BLK1 to BLKz are connected to a read and write circuit 123 through bit lines BL1 to BLm. Each of the plurality of memory blocks BLK1 to BLKz includes a plurality of memory cells. In an embodiment, the plurality of memory cells are non-volatile memory cells. Memory cells connected to the same word line among the plurality of memory cells are defined as one physical page. That is, the memory cell array 110 is configured with a plurality of physical pages. According to an embodiment of the present disclosure, each of the plurality of memory blocks BLK1 to BLKz included in the memory cell array 110 may include a plurality of dummy cells. At least one of the dummy cells may be connected in series between a drain select transistor and the memory cells and between a source select transistor and the memory cells.

Each of the memory cells of the memory device 100 may be configured as a Single Level Cell (SLC) that stores one data bit, a Multi-Level Cell (MLC) that stores two data bits, a Triple Level Cell (TLC) that stores three data bits, or a Quad Level Cell (QLC) that stores four data bits The peripheral circuit 120 may include an address decoder 121, a voltage generator 122, the read and write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The address decoder 121 is connected to the memory cell array 110 through the row lines RL. The row lines RL may include drain select lines, word lines, source select lines, and a common source line. According to an embodiment of the present disclosure, the word lines may include normal word lines and dummy word lines. According to a further embodiment of the present disclosure, the row lines RL may further include a pipe select line.

In an embodiment, the row lines RL may be local lines included in local line groups. A local line group may correspond to one memory block. The local line group may include a drain select line, local word lines, and a source select line.

The address decoder 121 is configured to operate in response to control of the control logic 130. The address decoder 121 receives a row address RADD from the control logic 130. The address decoder 121 is configured to decode the row address RADD.

The address decoder 121 is configured to decode a block address of the row address RADD. The address decoder 121 selects at least one memory block from among the memory blocks BLK1 to BLKz according to the decoded block address. The address decoder 121 may select at least one word line of a selected memory block by applying voltages supplied from the voltage generator 122 to at least one word line WL, and according to the decoded row address RADD.

During the program operation, the address decoder 121 may apply a program voltage to a selected word line and apply a pass voltage having a level less than that of the program voltage to unselected word lines. During a program verify operation, the address decoder 121 may apply a verify voltage to the selected word line and apply a verify pass voltage having a level greater than that of the verify voltage to the unselected word lines.

During the read operation, the address decoder 121 may apply a read voltage to the selected word line and apply a read pass voltage having a level greater than that of the read voltage to the unselected word lines.

According to an embodiment of the present disclosure, an erase operation of the memory device 100 is performed in memory block units. The address ADDR input to the memory device 100 during the erase operation includes a block address. The address decoder 121 may decode the block address and select one memory block according to the decoded block address. During the erase operation, the address decoder 121 may apply a ground voltage to the word lines connected to the selected memory block.

According to an embodiment of the present disclosure, the address decoder 121 may be configured to decode a column address of the transferred or transmitted address ADDR. The decoded column address may be transferred to the read and write circuit 123. As an example, the address decoder 121 may include a component such as a row decoder, a column decoder, and an address buffer.

The voltage generator 122 is configured to generate a plurality of operation voltages Vop by using an external power voltage supplied to the memory device 100. The voltage generator 122 operates in response to the control of the control logic 130.

As an example, the voltage generator 122 may generate an internal power voltage by regulating the external power voltage. The internal power voltage generated by the voltage generator 122 is used as an operation voltage of the memory device 100.

As an embodiment, the voltage generator 122 may generate the plurality of operation voltages Vop using the external power voltage or the internal power voltage. The voltage generator 122 may be configured to generate various voltages required by the memory device 100. For example, the voltage generator 122 may generate a plurality of erase voltages, a plurality of program voltages, a plurality of pass voltages, a plurality of selection read voltages, and a plurality of non-selection read voltages.

In order to generate the plurality of operation voltages Vop having various voltage levels, the voltage generator 122 may include a plurality of pumping capacitors that receive the internal voltage and selectively activate the plurality of pumping capacitors to generate the plurality of operation voltages Vop.

The plurality of generated operation voltages Vop may be supplied to the memory cell array 110 by the address decoder 121.

The read and write circuit 123 includes first to m-th page buffers PB1 to PBm. The first to m-th page buffers PB1 to PBm are connected to the memory cell array 110 through first to m-th bit lines BL1 to BLm, respectively. The first to m-th page buffers PB1 to PBm operate in response to the control of the control logic 130.

The first to m-th page buffers PB1 to PBm communicate data DATA with the data input/output circuit 124. At a time of program, the first to m-th page buffers PB1 to PBm receive the data DATA to be stored through the data input/output circuit 124 and data lines DL.

During the program operation, when a program pulse is applied to the selected word line, the first to m-th page buffers PB1 to PBm may transfer the data DATA to be stored, that is, the data DATA received through the data input/output circuit 124, to the selected memory cells through the bit lines BL1 to BLm. The memory cells of the selected page are programmed according to the transferred data DATA. A memory cell connected to a bit line to which a program permission voltage (for example, a ground voltage) is applied may have an increased threshold voltage. A threshold voltage of a memory cell connected to a bit line to which a program inhibition voltage (for example, a power voltage) is applied may be maintained at the same or substantially the same voltage. During the program verify operation, the first to m-th page buffers PB1 to PBm read the data DATA stored in the selected memory cells through the bit lines BL1 to BLm.

During the read operation, the read and write circuit 123 may read the data DATA from the memory cells of the selected page through the bit lines BL and store the read data DATA in the first to m-th page buffers PB1 to PBm.

During the erase operation, the read and write circuit 123 may float the bit lines BL. As an embodiment, the read and write circuit 123 may include a column selection circuit.

The data input/output circuit 124 is connected to the first to m-th page buffers PB1 to PBm through the data lines DL. The data input/output circuit 124 operates in response to the control of the control logic 130.

The data input/output circuit 124 may include a plurality of input/output buffers (not shown) that receive input data DATA. During the program operation, the data input/output circuit 124 receives the data DATA to be stored from an external controller (not shown). During the read operation, the data input/output circuit 124 outputs the data DATA transferred from the first to m-th page buffers PB1 to PBm, included in the read and write circuit 123, to an external controller.

During the read operation or the verify operation, the sensing circuit 125 may generate a reference current in response to a signal of a permission bit VRYBIT generated by the control logic 130, and may compare a sensing voltage VPB received from the read and write circuit 123 with a reference voltage generated by the reference current, and output a pass signal or a fail signal to the control logic 130.

The control logic 130 may be connected to the address decoder 121, the voltage generator 122, the read and write circuit 123, the data input/output circuit 124, and the sensing circuit 125. The control logic 130 may be configured to control all operations of the memory device 100. The control logic 130 may operate in response to a command CMD transferred from an external device.

The control logic 130 may generate various signals in response to the command CMD and the address ADDR to control the peripheral circuit 120. For example, the control logic 130 may generate an operation signal OPSIG, the row address RADD, a read and write circuit control signal PBSIGNALS, and the permission bit VRYBIT in response to the command CMD and the address ADDR. The control logic 130 may output the operation signal OPSIG to the voltage generator 122, output the row address RADD to the address decoder 121, output the read and write control signal to the read and write circuit 123, and output the permission bit VRYBIT to the sensing circuit 125. In addition, the control logic 130 may determine whether the verify operation is passed or failed in response to the pass or fail signal PASS/FAIL output by the sensing circuit 125.

Figure 3:
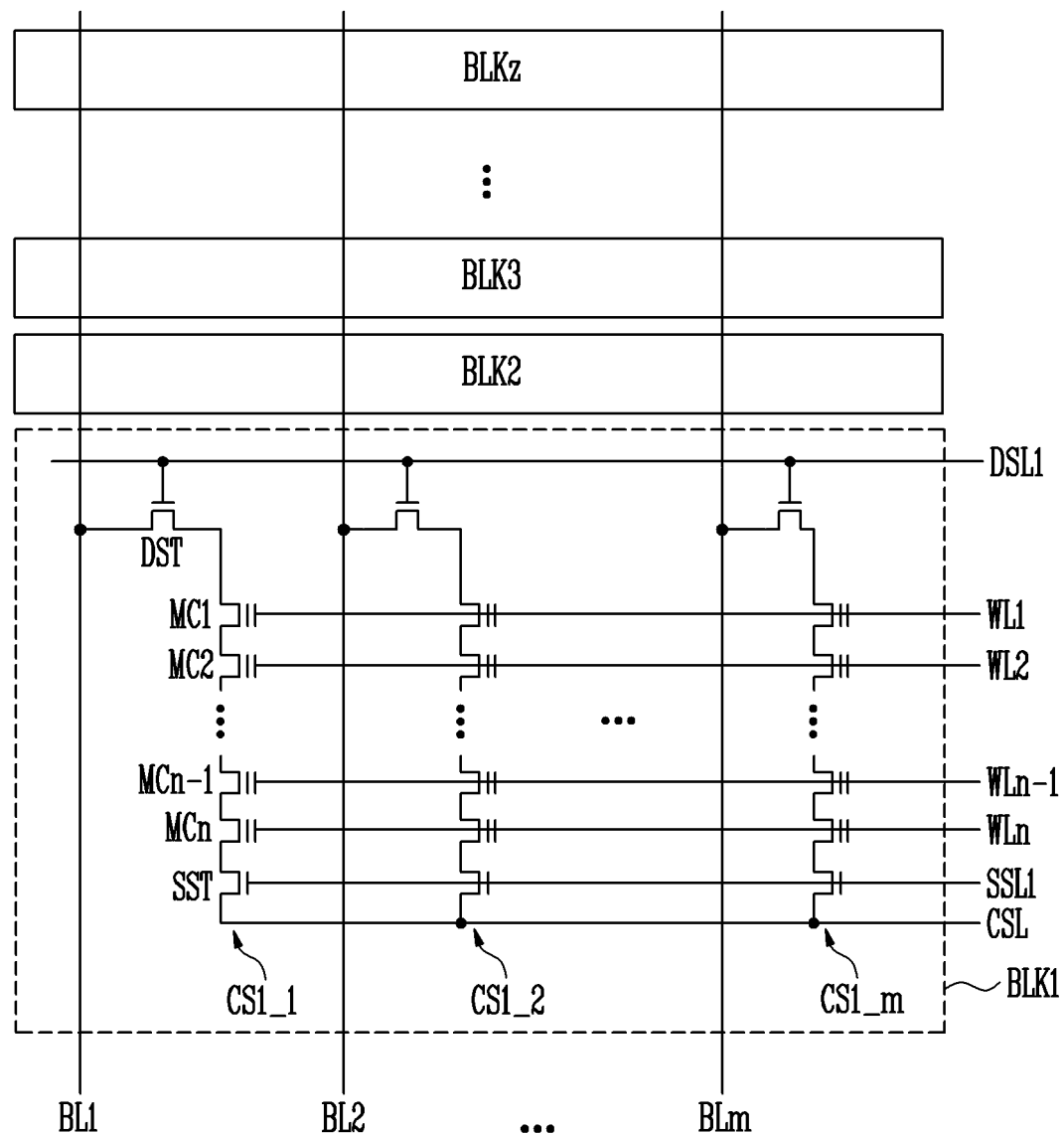
FIG. 3 is a diagram illustrating a memory cell array of FIG. 2.

FIG. 3 is a diagram illustrating a memory cell array of FIG. 2.

Referring to FIG. 3, the first to z-th memory blocks BLK1 to BLKz are commonly connected to the first to m-th bit lines BL1 to BLm. In FIG. 3, for convenience of description, elements included in the first memory block BLK1 of the plurality of memory blocks BLK1 to BLKz are shown, and elements included in each of the remaining memory blocks BLK2 to BLKz are omitted. It will be understood that each of the remaining memory blocks BLK2 to BLKz may be configured similarly to the first memory block BLK1.

The first memory block BLK1 may include a plurality of cell strings CS1_1 to CS1_m (m is a positive integer). The first to m-th cell strings CS1_1 to CS1_m are connected to the first to m-th bit lines BL1 to BLm, respectively. Each of the first to m-th cell strings CS1_1 to CS1_m includes a drain select transistor DST, a plurality of memory cells MC1 to MCn connected in series (n is a positive integer), and a source select transistor SST.

Gate terminals of the drain select transistors DST included in each of the first to m-th cell strings CS1_1 to CS1_m are connected to a drain select line DSL1. Gate terminals of the first to n-th memory cells MC1 to MCn included in each of the first to m-th cell strings CS1_1 to CS1_m are connected to the first to n-th word lines WL1 to WLn, respectively. Gate terminals of the source select transistors SST included in each of the first to m-th cell strings CS1_1 to CS1_m are connected to a source select line SSL1.

For convenience of description, a structure of the cell string will be described with reference to the first cell string CS1_1 of the plurality of cell strings CS1_1 to CS1_m. However, it will be understood that each of the remaining cell strings CS1_2 to CS1_m is configured similarly to the first cell string CS1_1.

A drain terminal of the drain select transistor DST included in the first cell string CS1_1 is connected to the first bit line BL1. A source terminal of the drain select transistor DST included in the first cell string CS1_1 is connected to a drain terminal of the first memory cell MC1 included in the first cell string CS1_1. The first to n-th memory cells MC1 to MCn are connected in series with each other. A drain terminal of the source select transistor SST included in the first cell string CS1_1 is connected to a source terminal of the n-th memory cell MCn included in the first cell string CS1_1. A source terminal of the source select transistor SST included in the first cell string CS1_1 is connected to a common source line CSL. As an embodiment, the common source line CSL may be commonly connected to the first to z-th memory blocks BLK1 to BLKz.

The drain select line DSL1, the first to n-th word lines WL1 to WLn, and the source select line SSL1 are included in row lines RL of FIG. 2. The drain select line DSL1, the first to n-th word lines WL1 to WLn, and the source select line SSL1 are controlled by the address decoder 121. The common source line CSL is controlled by the control logic 130. The first to m-th bit lines BL1 to BLm are controlled by the read and write circuit 123.

Figure 4:
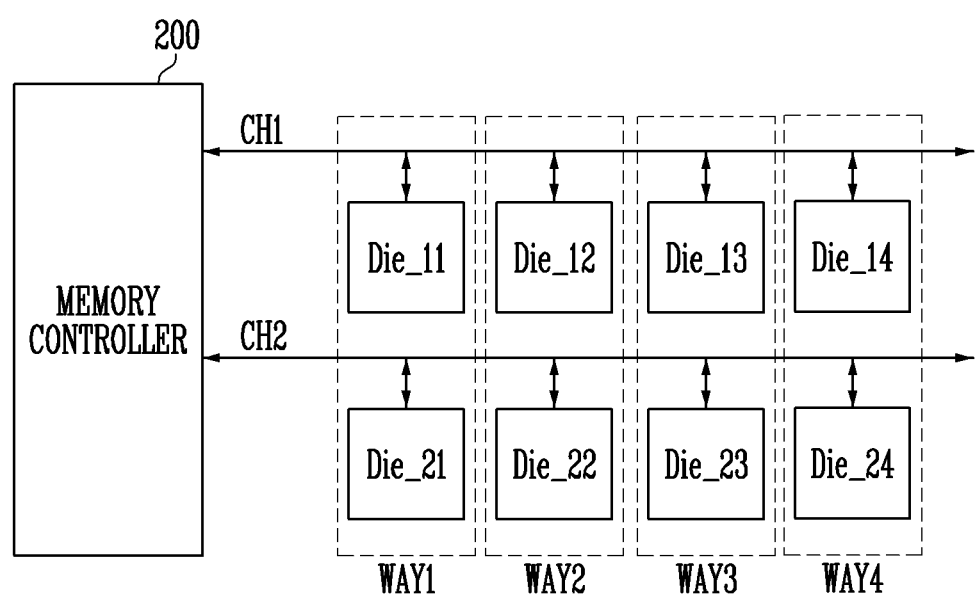
FIG. 4 is a diagram illustrating a method in which a memory controller controls a plurality of memory devices according to an embodiment of the disclosure.

FIG. 4 is a diagram illustration a method in which a memory controller controls a plurality of memory devices according to an embodiment of the disclosure.

Referring to FIG. 4, the memory controller 200 may be connected to a plurality of memory devices Die_11 to Die_14 and Die_21 to Die_24 through a first channel CH1 and a second channel CH2, respectively. The number of channels and the number of memory devices connected to each channel in FIG. 4 are exemplary and embodiments contemplated by the disclosure are not limited thereto.

The memory devices Die_11 to Die_14 may be commonly connected to the first channel CH1. The memory devices Die_11 to Die_14 may communicate with the memory controller 200 through the first channel CH1.

Because the memory devices Die_11 to Die_14 are commonly connected to the first channel CH1, only one memory device may communicate with the memory controller 200 at a time. However, internal operations of each of the memory devices Die_11 to Die_14 may be simultaneously performed.

The memory devices Die_21 to Die_24 may be commonly connected to the second channel CH2. The memory devices Die_21 to Die_24 may communicate with the memory controller 200 through the second channel CH2.

Because the memory devices Die_21 to Die_24 are commonly connected to the second channel CH2, only one memory device may communicate with the memory controller 200 at a time. Internal operations of each of the memory devices Die_21 to Die_24 may be simultaneously performed.

A storage device using a plurality of memory devices may improve performance by using data interleaving which is data communication using an interleave method. The data interleaving may be performing a data read operation or a data write operation by moving or shifting a way in a structure in which two or more ways share one channel. For the data interleaving, the memory devices may be managed in a unit of a channel and a way. In order to maximize parallelism of the memory devices connected to each channel, the memory controller 200 may disperse or distribute consecutive logical memory areas into units of a channel and a way and allocate the consecutive logical memory areas.

For example, the memory controller 200 may transmit a command, a control signal including an address, and data to the memory device Die_11 through the first channel CH1. While the memory device Die_11 programs the transmitted data to a memory cell included therein, the memory controller 200 may transmit a command, a control signal including an address, and data to the memory device Die_12.

In FIG. 4, the plurality of memory devices may be configured of four ways WAY1 to WAY4. The first way WAY1 may include the memory devices Die_11 and Die_21. The second way WAY2 may include the memory devices Die_12 and Die_22. The third way WAY3 may include the memory devices Die_13 and Die_23. The fourth way WAY4 may include the memory devices Die_14 and Die_24.

Each of the channels CH1 and CH2 may be a bus of signals shared and used by the memory devices connected to the corresponding channel.

In FIG. 4, the data interleaving in a two channel/four way structure has been described. However, interleaving may be more efficient as the number of channels and the number of ways increase.

Figure 5:
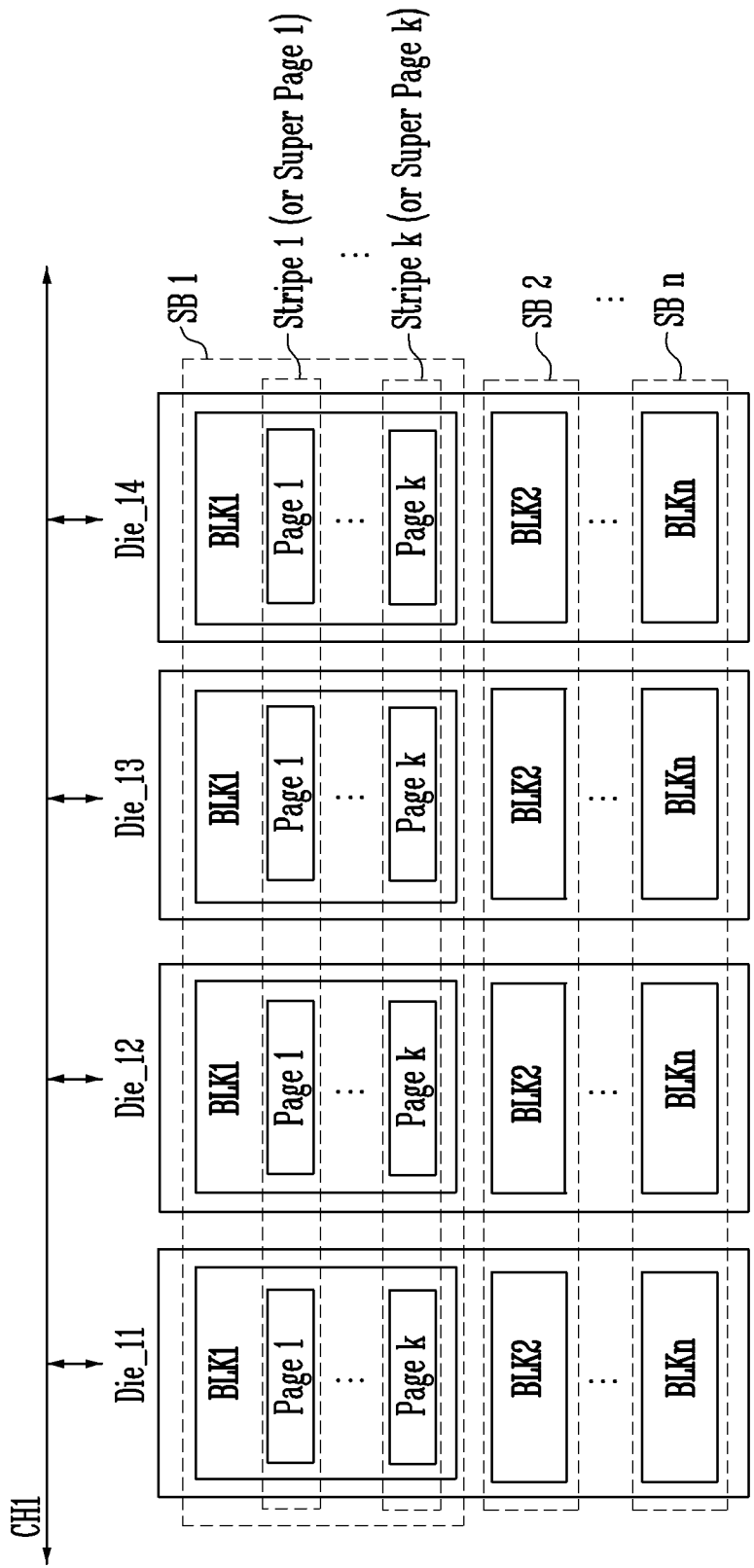
FIG. 5 is a diagram illustrating a super block according to an embodiment of the disclosure.

FIG. 5 is a diagram illustrating a super block according to an embodiment of the disclosure.

Referring to FIG. 5, memory devices Die_11 to Die_14 may be commonly connected to a first channel CH1.

In FIG. 5, each memory device may include a plurality of planes. However, for convenience of description, it is assumed that one memory device includes one plane in the present specification. One plane may include a plurality of memory blocks BLK1 to BLKn (n is a natural number of 1 or more), and one memory block may include a plurality of pages Page 1 to Page k, (k is a natural number of 1 or more).

A memory controller may control memory blocks included in a plurality of memory devices commonly connected to one channel in a super block unit. In other words, a super block may include at least two memory blocks included in different memory devices connected to a common channel.

For example, the first memory blocks BLK1 included in each of the memory devices Die_11 to Die_14 may configure or constitute a first super block SB 1. The second memory blocks BLK2 included in each of the memory devices Die_11 to Die_14 may configure or constitute a second super block SB 2. In the same manner, the n-th memory blocks BLKn included in each of the memory devices Die_11 to Die_14 may configure or constitute an n-th super block SB n. Therefore, the memory devices Die_11 to Die_14 connected to the first channel CH1 may include the first to n-th super blocks SB 1 to SB n.

A super block may be configured of or include a plurality of stripes. The stripe may be used interchangeably with a term "super page".

One stripe or super page may include a plurality of pages. For example, first pages Page 1 of each of the plurality of first memory blocks BLK1 that are part of the first super block SB 1 may configure or constitute a first stripe Stripe 1 or a first super page Super Page 1.

Therefore, one super block may include first stripe Stripe 1 to k-th stripe Stripe k. Alternatively, one super block may include first super page Super Page 1 to k-th super page Super Page k.

The memory controller may store or read data in a stripe unit or a super page unit when storing the data in the memory devices DIE_11 to DIE_14 or reading the stored data from the memory devices DIE_11 to DIE_14.

Figure 6:
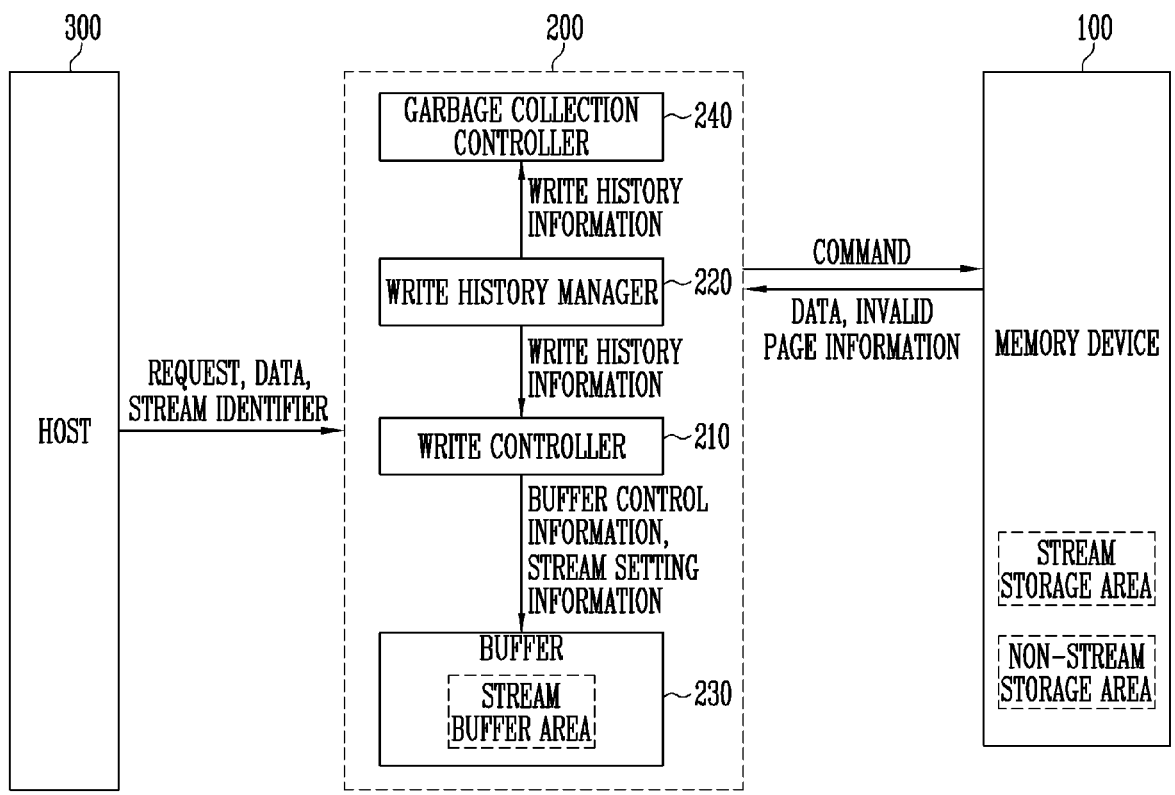
FIG. 6 is a diagram illustrating a configuration and an operation of a memory controller according to an embodiment of the disclosure.

FIG. 6 is a diagram illustrating a configuration and an operation of a memory controller according to an embodiment of the disclosure.

Referring to FIG. 6, the memory device 100 may include a stream storage area and a non-stream storage area. The stream storage area may be an area for storing a write data corresponding to a request and a stream identifier provided by the host 300. The non-stream storage area may be an area for storing write data provided by the host 300 in the absence of a stream identifier. The write data provided by the host 300 may be selectively stored in the stream storage area or the non-stream storage area consistent with the presence or absence of the stream identifier.

A memory controller 200 may include a write controller 210, a write history manager 220, a buffer 230, and a garbage collection controller 240.

The write controller 210 may control the buffer 230 and the memory device 100 to store, in the memory device 100, a write data stored in the buffer 230.

Specifically, the write controller 210 may provide buffer control information to the buffer 230, so that in response the buffer 230 may provide the write data to the memory device 100. The write controller 210 may also provide a program command to the memory device 100 to store the write data.

When the write controller 210 receives a setting request for a stream from the host 300, the write controller 210 may provide a stream setting information, to the buffer 230, for allocating the stream buffer area corresponding to the requested stream. The write controller 210 may provide a stream setting command, to the memory device 100, for allocating the stream storage area corresponding to the requested stream.

The write controller 210 may receive the write data corresponding to the stream identifier indicating a specific stream from the host 300. The write controller 210 may store the received write data in the stream buffer area corresponding to the specific stream of the buffer 230. The write controller 210 may provide a program command, to the memory device 100, for storing the write data in the stream storage area corresponding to the specific stream of the memory device 100.

When the write controller 210 receives a release request for a specific stream from the host 300, the write controller 210 may provide a stream setting information, to the buffer 230, for releasing the stream buffer area corresponding to the specific stream.

The write controller 210 may control a size of the stream buffer area allocated to the buffer 230, based on the write history information provided from the write history manager 220. The write controller 210 may provide, to the buffer 230, a stream setting information for controlling the size of the stream buffer area.

The write controller 210 may calculate a write resource of each stream buffer area based on a write operation frequency of each of the plurality of stream storage areas included in the write history information. The total write count value of the stream storage area included in the write history information may be an indicator of or correlate to the write operation frequency of the stream storage area.

The write resource of the stream buffer area corresponding to the stream storage area is relatively low when the write operation frequency is high. The write resource of the stream buffer area corresponding to the stream storage area is relatively high when the write operation frequency is low.

In an embodiment, the write controller 210 may reduce a size of the stream buffer area when the write resource is relatively large, and increase the size of the stream buffer area when the write resource is relatively small. In another embodiment, the write controller 210 may allocate a portion of the stream buffer area with a greater write resource to the stream buffer area with a lesser write resource.

The write history manager 220 may count the number of write operations performed on each of the plurality of stream storage areas of the memory device 100 that corresponds to the stream identifiers provided from the host 300.

Specifically, the write history manager 220 may store, as write count information, write count values of each of the plurality of stream storage areas during a set period. The write history manager 220 may store write count information calculated in each set period. The set period may be a time of a preset length or a period of time in which a preset number of write operations are performed in the plurality of stream storage areas.

In an embodiment, the write history manager 220 may store the write count information up to a preset number. When the number of stored write count information reaches a preset number, the write history manager 220 may overwrite oldest stored write count information with newly generated write count information.

For each of the plurality of stream storage areas, the write history manager 220 may generate write history information indicative of a write operation frequency based on the plurality of stored write count information. Specifically, the write history manager 220 may add the write count values of each of the plurality of stream storage areas to existing write count values in the plurality of write count information for each stream storage area. The write history manager 220 may generate the write history information including a total write count value of each stream storage area, based on the result of the added total.

The buffer 230 may allocate a new stream buffer area having a default size according to the stream setting information provided from the write controller 210. The stream buffer area may include a variable area and a fixed area. The buffer 230 may release a previously allocated stream buffer area in response to a received stream setting information.

The buffer 230 may control a size of the allocated stream buffer area in response to a received stream setting information. The buffer 230 may control a size of the variable area of the stream buffer area.

Using write history information provided from the write history manager 220, the garbage collection controller 240 may select a target stream storage area, from a plurality of stream storage areas included in the memory device 100, to perform a garbage collection operation.

The garbage collection controller 240 may calculate an invalid page count value corresponding to a stream storage area. In an embodiment, the invalid page count value corresponding to the stream storage area may be an average value of the invalid page counts of a plurality of memory blocks included in the stream storage area. In another embodiment, the invalid page count value corresponding to the stream storage area may be the highest count value of the invalid page counts of the plurality of memory blocks included in the stream storage area.

Using an invalid page count value of each stream storage area and a total write count value included in the write history information, the garbage collection controller 240 may calculate a corrected invalid page count value for each stream storage area. The garbage collection controller 240 may select a stream storage area having the highest corrected invalid page count value, from among the plurality of stream storage areas, as the target stream storage area.

The garbage collection controller 240 may control the memory device 100 to perform the garbage collection operation on the target stream storage area.

For example, the garbage collection controller 240 may provide a command to the memory device 100 to read a valid data stored in the at least two victim blocks included in the target stream storage area. The garbage collection controller 240 may provide a program command to the memory device 100 to store the read valid data in a free block in the target stream storage area. The garbage collection controller 240 may provide an erase command to the memory device 100 to erase the at least two victim blocks.

Figure 7:
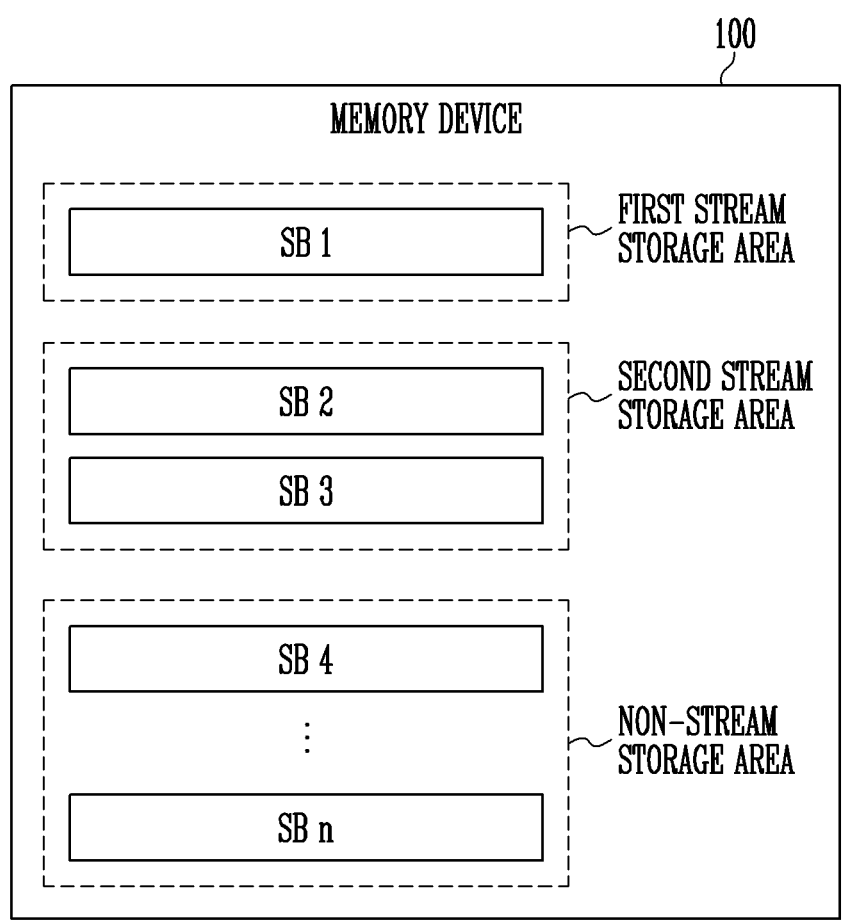
FIG. 7 is a diagram illustrating a stream storage area of a memory device according to an embodiment of the disclosure.

FIG. 7 is a diagram illustrating a stream storage area of a memory device according to an embodiment of the disclosure.

Referring to FIG. 7, at least one memory device 100 may include a plurality of stream storage areas and non-stream storage areas.

The memory device 100 may allocate a stream storage area in response to a stream setting command provided by a memory controller. The stream setting command may be a command provided by the memory controller to the memory device 100 to allocate a stream storage area corresponding to a requested stream, in response to a stream setting request provided by the host.

The stream storage area may be an area for storing a write data corresponding to a stream identifier provided by the host. The non-stream storage area may be an area for storing a write data provided by the host in the absence of a stream identifier.

In an embodiment, the stream storage area may be allocated in a super block unit described with reference to FIG. 5. The super block may be newly allocated to the stream storage area, or the allocated super block may be released, according to whether there is enough space in the stream storage area to store write data. For example, when the number of free super block that can store write data, among super blocks allocated to the stream storage area, is insufficient, a new super block may be allocated to the stream storage area. In a contrast, when the number of free super block is sufficient, a free super block already allocated to the stream storage area may be released.

In FIG. 7, at least one memory device 100 may include first to n-th super blocks SB 1 to SB n.

The first super block SB 1 may be allocated to a first stream storage area. In other words, the first stream storage area may include the first super block SB 1. The second and third super blocks SB 2 and SB 3 may be allocated to a second stream storage area. The second stream storage area may include the second and third super blocks SB 2 and SB 3. The fourth to n-th super blocks SB 4 to SB n may not have an allocated specific stream storage area. Therefore, the non-stream storage area may include fourth to n-th super blocks SB 4 to SB n.

Figure 8:
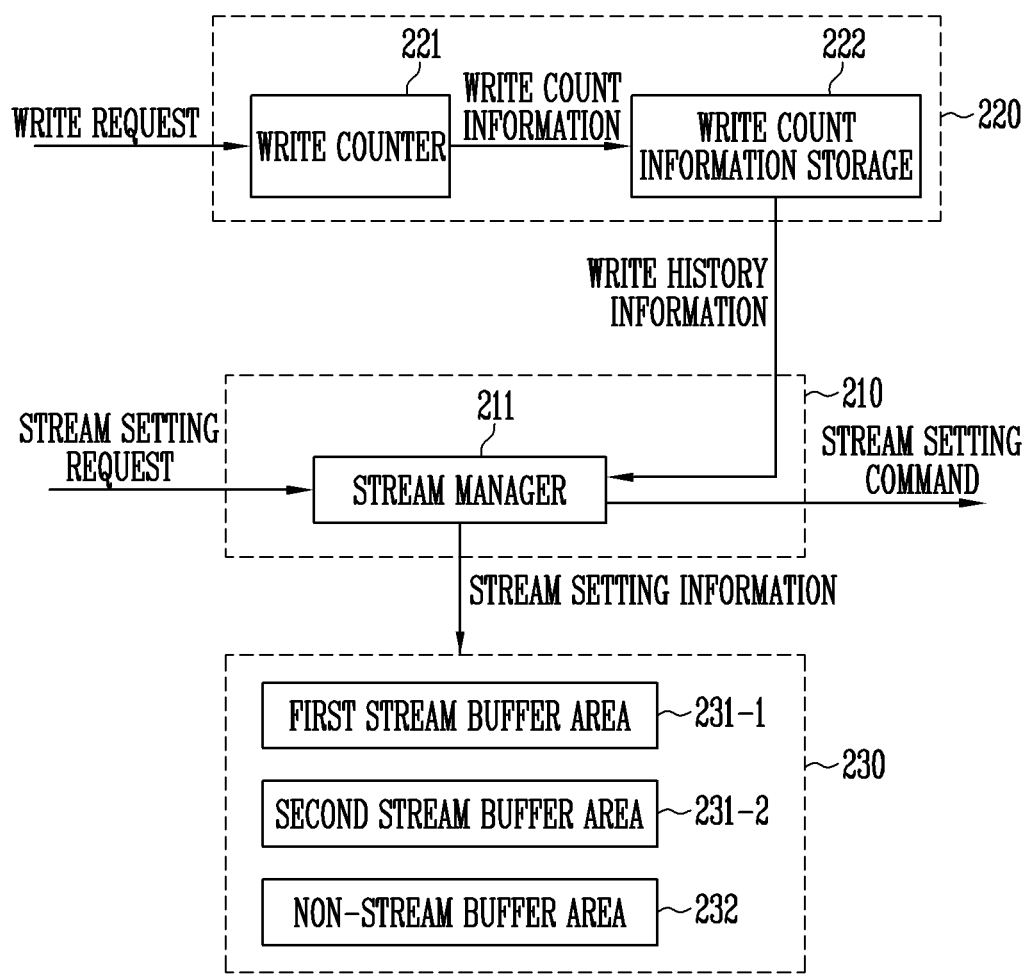
FIG. 8 is a diagram illustrating a configuration and an operation of a write controller and a write history manager of FIG. 6 according to an embodiment of the disclosure.

FIG. 8 is a diagram illustrating a configuration and an operation of a write controller 210 and a write history manager 220 of FIG. 6 according to an embodiment of the disclosure.

Referring to FIG. 8, the write controller 210 may include a stream manager 211. The write history manager 220 may include a write counter 221 and a write count information storage 222. The buffer 230 may include a first stream buffer area 231-1, a second stream buffer area 231-2, and a non-stream buffer area 232.

When a stream manager 211 receives a stream setting request for the specific stream from the host 300, the stream manager 211 may provide a stream setting information for allocating the stream buffer area, corresponding to the requested stream, to the buffer 230. The stream manager 211 may provide, to the memory device 100, a stream setting command for allocating the stream storage area corresponding to the requested stream.

When the stream manager 211 receives a release request (not shown) for a specific stream from the host 300, the stream manager 211 may provide, to the buffer 230, a stream setting information for releasing the stream buffer area corresponding to the specific stream.

The stream manager 211 may control a size of a stream buffer area allocated to the buffer 230, based on the write history information provided from the write count information storage 222. The stream manager 211 may provide a stream setting information for controlling the size of the stream buffer area to the buffer 230.

The stream manager 211 may calculate write resources of stream buffer areas based on write operation frequencies, included in the write history information, of each of the plurality of stream storage areas.

The write resource indicates a size of an available area in the stream buffer area corresponding to the stream storage area. The write resource may be a relative value to determine whether the stream buffer area corresponding to the stream storage area is sufficient or insufficient in size, depending on write operation frequencies measured on the stream storage area. The write resource is inversely proportional to a write operation frequency.

For example, a stream storage area with a relatively high write operation frequency may have an insufficient stream buffer area size in comparison to a stream storage area with a relatively low write operation frequency. Therefore, it may be determined that the stream buffer area corresponding to the stream storage area with a relatively high the write operation frequency has relatively less or fewer write resources than the stream buffer area corresponding to the stream storage area with a relatively low write operation frequency.

In an embodiment, a write operation frequency may be calculated based on a total write count value for a stream storage area included in a write history information. Therefore, it may be determined that the stream buffer area corresponding to the stream storage area of which the total write count value is high has relatively less or fewer write resources than the stream buffer area corresponding to the stream storage area of which the total write count value is low.

In an embodiment, the stream manager 211 may control the buffer 230 to reduce a size of the first stream buffer area 231-1 of which the write resource is greater or larger and increase a size of the second stream buffer area 231-2 of which the write resource is lesser or fewer. In another embodiment, the stream manager 211 may control the buffer 230 to allocate a portion of the first stream buffer area 231-1 of which the write resource is greater to the second stream buffer area 231-2 of which the write resource is lower.

The write counter 221 may count the number of the write operations, performed on each of the plurality of stream storage areas of the memory device 100, in connection with the stream identifier included in the write request received from the host 300.

Specifically, the write counter 221 may store the write count values of each of the plurality of stream storage areas during a set period, as a write count information, in the write count information storage 222. The write counter 221 may store the write count information in the write count information storage 222 every set period. The set period may be a period of time of a preset length or a period of time in which a preset number of write operations are performed in the plurality of stream storage areas.

In an embodiment, the write count information storage 222 may store the write count information up to a preset number. When the number of write count information stored in the write count information storage 222 reaches the preset number, the write counter 221 may overwrite the oldest stored write count information with the newly generated write count information.

Using a stored plurality of write count information, the write count information storage 222 may generate a write history information indicating a write operation frequency for each of the plurality of stream storage areas. Specifically, the stored plurality of write count information includes the write count values for each of the plurality of stream storage areas. The write count information storage 222 may add the write count values for each of the plurality of stream storage areas to calculate a total write count value. Using the additive total result, the write count information storage 222 may generate the write history information including the total write count value for each of the plurality of stream storage area.

The buffer 230 may allocate a new stream buffer area according to a stream setting information provided from the stream manager 211. The buffer 230 may release a previously allocated stream buffer area according to a stream setting information. The buffer 230 may control a size of an allocated stream buffer area according to a stream setting information. The buffer 230 may allocate a buffer memory area, excluding the allocated stream buffer area, to the non-stream buffer area 232.

Figure 9:
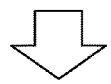
FIG. 9 is a diagram illustrating a write count information storage of FIG. 8 according to an embodiment of the disclosure.

FIG. 9 is a diagram illustrating a write count information storage of FIG. 8 according to an embodiment of the disclosure.

Referring to FIG. 9, the write count information storage may store a plurality of write count information.

The write count information may include a number of write operations performed on each of the plurality of stream storage areas during a set period. The set period may be a time of a preset length or a period of time in which a preset number of write operations are performed on the plurality of stream storage areas. The write count information storage 222 may store the write count information in each and every set period.

In an embodiment, the write count information storage may store up to a preset number of write count information. When the number of write count information stored in the write count information storage 222 reaches the preset number, the oldest stored write count information may be over-written with the newly generated write count information.

For example, the write count information storage may store four write count information. Each write count information may include the number of write operations performed on each of first to third stream storage areas Stream 1 to Stream 3, when 100 write operations are performed on the first to third stream storage areas Stream 1 to Stream 3.

In an embodiment, write count information having indices of 1, 2, and 4 may be write count information corresponding to completed storage operations. In an example, write count information having an index of 2 may be write count information for the most recently completed storage operation, while write count information having an index of 4 may be write count information for the earliest completed storage operation.

Write count information having an index of 3 may be write count information for an incomplete storage operation. In other words, the write count information having the index of 3 may be write count information that is currently being generated.

When the number of write operations performed on the first to third stream storage areas Stream 1 to Stream 3 having the index of 3 reaches 100, storage of the write count information having the index of 3 may be completed. Thereafter, the next generated write count information may be overwrite the write count information having the index of 4. In this manner, the write count information stored in the write count information storage may be managed in a first-in, first-out or wrap around method as the index is rotated.

The write count information storage 222 may generate a write history information indicating a write operation frequency for each of a plurality of stream storage areas, using the stored plurality of write count information. Specifically, the stored plurality of write count information includes the write count values for each of the plurality of stream storage areas. the write count information storage 222 may add the write count values of each of the plurality of stream storage areas to calculate a total write count value. Using the stored plurality of write count information, the write count information storage 222 may generate a write history information, including the total write count value of each stream storage area.

In an embodiment, the write history information may include the total write count values of each of the plurality of stream storage areas. The total write count values may be obtained by summing write count values of each of the plurality of stream storage areas stored in the write count information storage for each stream storage area.

In FIG. 9, the write history information may be generated based on the write count information having the indices of 1, 2, and 4, in which storage is completed. The total write count values of each of the first to third stream storage areas Stream 1 to Stream 3 included in the write history information may be obtained by summing the write count values included in the write count information having the indices of 1, 2, and 4 for each stream storage area.

For example, referring to FIG. 9, the total write count value of the first stream storage area Stream 1 may be 100. The total write count value of the second stream storage area Stream 2 may be zero. The total write count value of the third stream storage area Stream 3 may be 200.

In various embodiments, the write history information may be generated based on the write count information of which the storage is completed as well as on the write count information that is currently being generated. In an example, the total write count value of the first stream storage area Stream 1 may be 150. The total write count value of the second stream storage area Stream 2 may be zero. The total write count value of the third stream storage area Stream 3 may be 230.

The total write count values of each stream storage area included in the write history information may indicate or correlate to the write operation frequency of each stream storage area. The higher the total write count value, the higher the frequency of write operations performed on the stream storage area. The lower the total write count value, the lower the frequency of write operations performed on the stream storage area.

The lower the frequency of write operations of the stream storage area, the more write resources of the stream buffer area corresponding to the stream storage area. The higher the frequency of write operations of the stream storage area, the fewer write resources of the stream buffer area corresponding to the stream storage area.

Referring to FIG. 9, for example because the total write count value of the second stream storage area Stream 2 is the lowest at 0, the write operation frequency may also be the lowest. The write resources of the stream buffer area corresponding to the second stream storage area Stream 2 may therefore be the greatest or largest. In contrast, the total write count value of the third stream storage area Stream 3 is the highest at 200, so the write operation frequency may be the highest. The write resource of the stream buffer area corresponding to the third stream storage area Stream 3 may therefore be the least or the lowest. Because the total write count value of the first stream storage area Stream 1 is in between at 100, the write operation frequency falls between the other two write operation frequencies. Thus, the write resource of the stream buffer area corresponding to the first stream storage area Stream 1 may be relatively medium in size or number.

Figure 10:
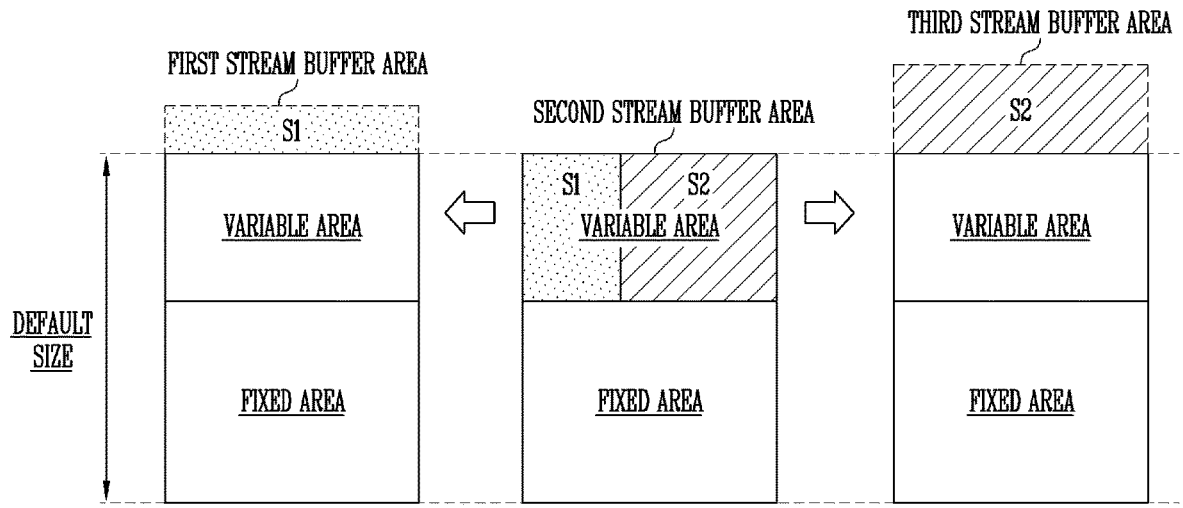
FIG. 10 is a diagram illustrating a size control of a stream buffer area according to an embodiment of the disclosure.

FIG. 10 is a diagram illustrating a size control of a stream buffer area according to an embodiment of the invention.

Referring to FIG. 10, each of the first to third stream buffer areas may have a default size, and each may include a variable area and a fixed area.

By referring to the write history information described with reference to FIG. 9, the sizes of the first to third stream buffer areas may be controlled or modified.

Referring to FIGS. 9 and 10, the total write count value of the first stream buffer area may be set to 100, which is the total write count value of the first stream storage area. The total write count value of the second stream buffer area may be set to 0, which is the total write count value of the second stream storage area. The total write count value of the third stream buffer area may be set to 200, which is the total write count value of the third stream storage area.

In an embodiment, the variable area of the second stream buffer area, which has greater write resources, may be allocated to the first and third stream buffer areas, each of which has fewer write resources. The variable area of the second stream buffer area may be allocated to the first and third stream buffer areas based on the total write count value of the first and third stream buffer areas.

In an example, the whole total write count sum included in the write history information may be 300, and thus a ratio occupied by the total write count value of the first stream buffer area may be ⅓ (100/300). A ratio occupied by the total write count value of the third stream buffer area may be ⅔ (200/300).

Therefore, an S1 area that is ⅓ of the variable area of the second stream buffer area may be allocated to the first stream buffer area, and an S2 area that is ⅔ of the variable area of the second stream buffer area may be allocated to the third stream buffer area.

In another embodiment, the entire area of the second stream buffer area, which has a relatively great or large write resource, may be allocated to the first and third stream buffer areas, each of which has a relatively small or lower write resource. In another embodiment, a new buffer memory area may be allocated to the first and third stream buffer areas with fewer write resources (according to the write history information) regardless of the magnitude of write resources of the second stream buffer area.

Figure 11:
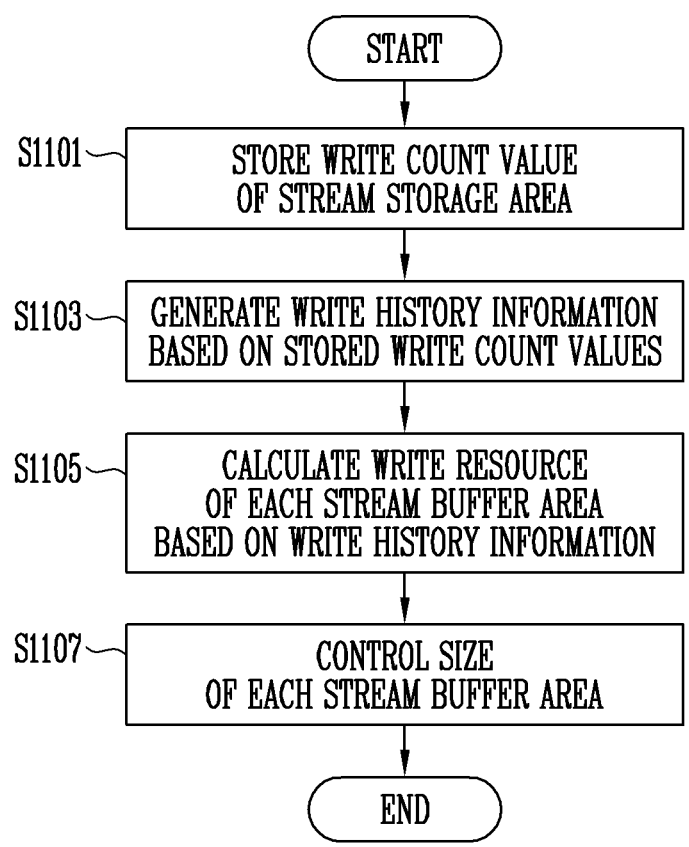
FIG. 11 is a flowchart illustrating an operation of controlling a size of a stream buffer area of a memory controller according to an embodiment of FIG. 10.

FIG. 11 is a flowchart illustrating an operation of controlling a size of the stream buffer area of a memory controller according to an embodiment of FIG. 10.

Referring to FIG. 11, in step S1101, the memory controller may store a write count value for each of a plurality of stream storage areas of a memory device. The write count value may be a number of write operations performed on a stream storage area.

In step S1103, the memory controller may generate a write history information indicating or corresponding to a write operation frequency of each of the plurality of stream storage areas based on or using the stored write count values to calculate total write count values.

In step S1105, the memory controller may calculate a write resource of a stream buffer area corresponding to each stream storage area based on or using a total write count value (included in the write history information) that is indicative or correlates to the write operation frequency.

In step S1107, the memory controller may control the size of the stream buffer area based on the calculated write resource. Specifically, the memory controller may increase the size of the stream buffer area with fewer write resources and reduce the size of the stream buffer area with greater write resources.

Figure 12:
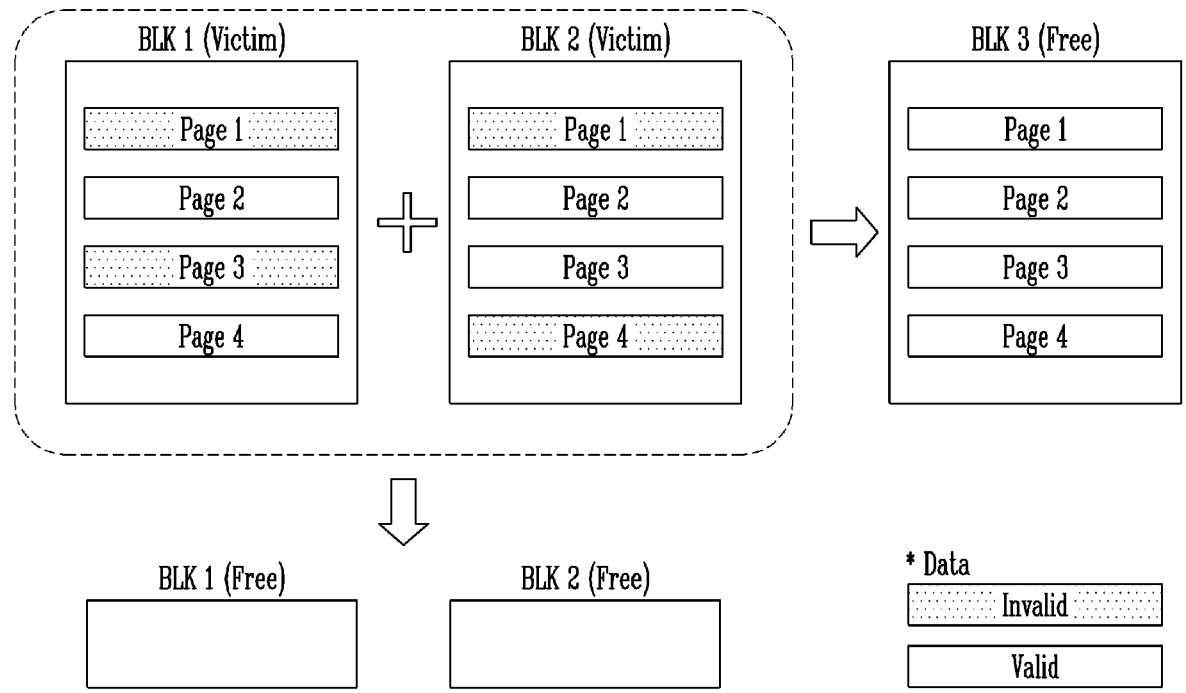
FIG. 12 is a diagram illustrating a garbage collection operation according to an embodiment of the disclosure.

FIG. 12 is a diagram illustrating a garbage collection operation according to an embodiment of the disclosure.

Referring to FIG. 12, the garbage collection operation may be an operation of copying a valid data stored in at least two victim blocks to a free block, and erasing the at least 2 victim blocks to free or release a block with insufficient resources.

For example, memory blocks BLK 1 and BLK 2 may be victim blocks. A memory block BLK 3 may be a free block.

Data stored in the pages Page 2 and Page 4 of the victim block BLK 1 may be valid data. Data stored in the pages Page 2 and Page 3 of the victim block BLK 2 may be valid data. The valid data stored in the victim blocks BLK 1 and BLK 2 may be copied to the free block BLK 3. The free block BLK 3 storing valid data may be set as a data block. Thereafter, the victim blocks BLK 1 and BLK 2 may be erased and then set as the free block.

Figure 13:
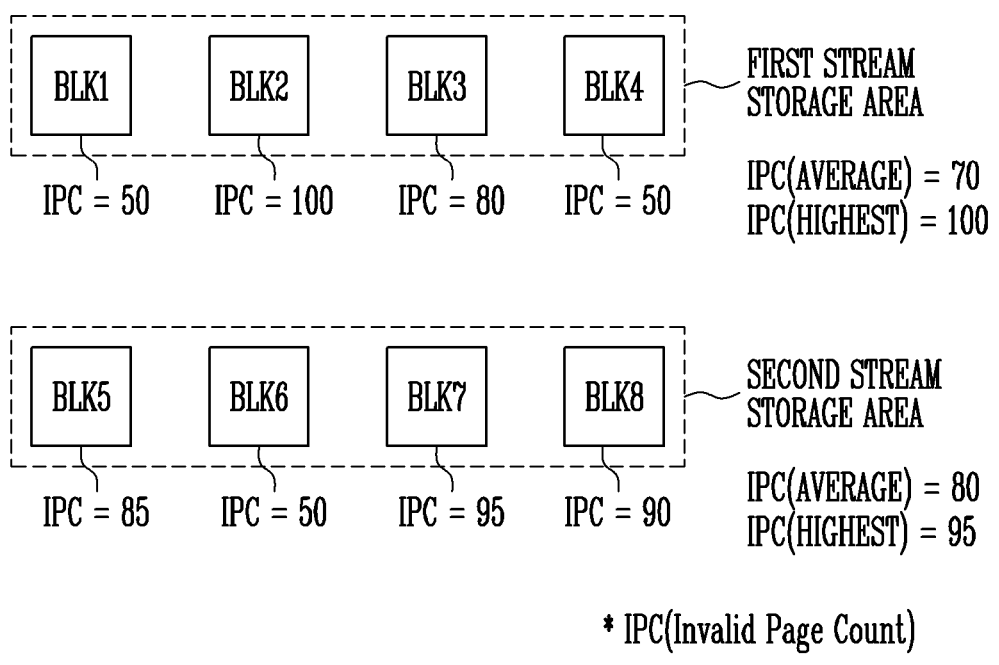
FIG. 13 is a diagram illustrating an operation of selecting a stream storage area in which a garbage collection operation is to be performed according to an embodiment of the disclosure.

FIG. 13 is a diagram illustrating an operation of selecting a stream storage area in which a garbage collection operation is to be performed according to an embodiment of the disclosure.

Referring to FIG. 13, a first stream storage area may include first to fourth memory blocks BLK1 to BLK4. A second stream storage area may include fifth to eighth memory blocks BLK5 to BLK8. The number of memory blocks included in each stream storage area in FIG. 13 is illustrative and the number of memory blocks are not so limited in embodiments contemplated by the disclosure.

Each stream storage area of the memory device may include a plurality of memory blocks. An invalid page count (IPC) may be the number of pages in which invalid data is stored among pages included in a memory block.

The garbage collection operation may be more efficient when performed in a stream storage area that has a large number of memory blocks with a high invalid page count value. The target stream storage area in which the garbage collection operation is to be performed may be determined based on or using an invalid page count value.

In an embodiment, the invalid page count value of a stream storage area may be an average value of invalid page count values of all of the memory blocks included in the stream storage area.

For example, the average invalid page count value corresponding to a first stream storage area may be 70. The average invalid page count value corresponding to a second stream storage area may be 80. In this example, the second stream storage area may be selected as the target stream storage area in which a garbage collection operation is to be performed.

In another embodiment, the invalid page count value corresponding to a stream storage area may be the highest value among the invalid page count values of all the memory blocks included in the stream storage area.

For example, an invalid page count value corresponding to a first stream storage area may be 100. An invalid page count value corresponding to a second stream storage area may be 95. In this case, the first stream storage area may be selected as the target stream storage area in which a garbage collection operation is to be performed.

During the garbage collection operation, the valid data stored in at least two victim blocks may be transferred to the free block in order of increasing invalid page count value, or increasing average invalid page count value, among the memory blocks included in the target stream storage area. Thereafter, the at least two victim blocks may be erased and then set as the free block.

Figures 14, 15:
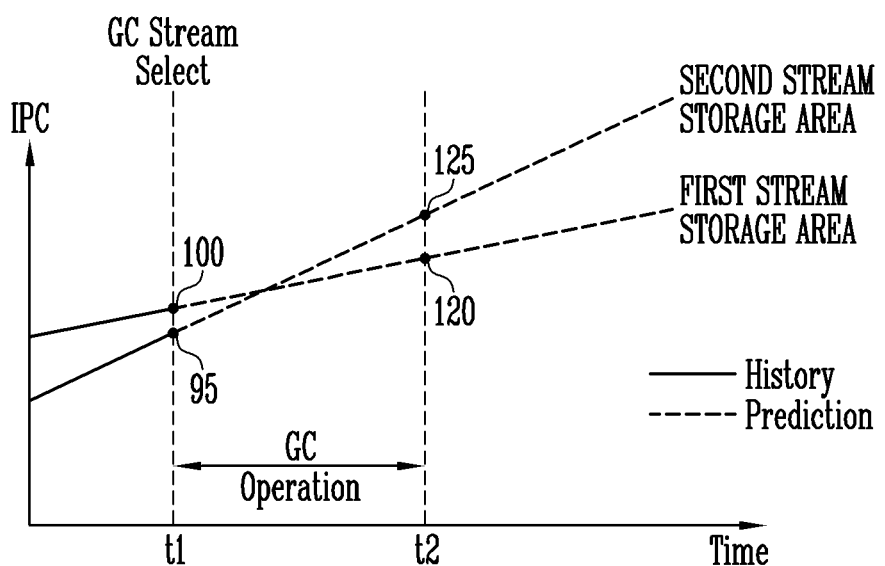
FIG. 14 is a diagram illustrating a corrected invalid page count value according to an embodiment of the disclosure.
FIG. 15 is a diagram illustrating a corrected invalid page count value of FIG. 14.

FIG. 14 is a diagram illustrating a corrected invalid page count value according to an embodiment of the disclosure.

Referring to FIG. 14, the corrected invalid page count value may be calculated based on an existing invalid page count value IPC and a total write count value TotWC, which is included in the write history information.

Specifically, the corrected invalid page count value may be a value obtained by summing the invalid page count value IPC to a value obtained by multiplying a correction coefficient (a) by the total write count value TotWC. The correction coefficient (a) may be variously set in a range from −1 to 1, inclusive, according to a correlation between the total write count value and the invalid page count value. In other words, the correction coefficient (a) may be variously set according to a correlation between the write operation frequency of the stream storage area and the invalid page count value. In FIG. 14, it is assumed that the correction coefficient (a) is 0.5.

In FIG. 14, it is assumed that the invalid page count value corresponding to the stream storage area is the highest value among the invalid page count values of the memory blocks included in the stream storage area.

Referring to FIG. 13, the highest invalid page count value corresponding to the first stream storage area Stream 1 may be 100, and the highest invalid page count value corresponding to the second stream storage area Stream 2 may be 95. In FIG. 14, a total write count value TotWC of the first stream storage area Stream 1 included in the write history information may be 40, and a total write count value TotWC of the second stream storage area Stream 2 may be 60.

Referring to FIG. 14, a corrected invalid page count value corresponding to the first stream storage area Stream 1 may be calculated as 120. A corrected invalid page count value corresponding to the second stream storage area Stream 2 may be calculated to be 125.

Before correction, the invalid page count value 100 of the first stream storage area may be greater than the invalid page count value 95 of the second stream storage area. Therefore, before correction, the first stream storage area may be selected as the target stream storage area in which the garbage collection operation is to be performed.

After correction, the corrected invalid page count value 125 of the second stream storage area may be greater than the corrected invalid page count value 120 of the first stream storage area. Therefore, after correction the second stream storage area may be selected as the target stream storage area in which the garbage collection operation is to be performed.

FIG. 15 is a diagram illustrating a corrected invalid page count value of FIG. 14.

Referring to FIG. 15, a horizontal axis may indicate time, and a vertical axis may indicate the invalid page count value corresponding to the stream storage area.

As the number of write operations to the memory block increases, an invalid page count of the memory block may also increase. Therefore, it may be predicted that if the stream storage area of which the write operation frequency is higher, then there is also an increase in an invalid page count of the memory blocks included in the stream storage area. It may be predicted that if the stream storage area has a higher write operation frequency, then there is also an increase in the invalid page count value corresponding to the stream storage area.

Therefore, the invalid page count value corresponding to the stream storage area may be estimated based on the write operation frequency of the stream storage area. The invalid page count value corresponding to the stream storage area may be predicted based on the total write count value of the stream storage area.

In FIG. 15, a time point t1 may be a current time point for selecting the target stream storage area in which the garbage collection operation is to be performed. A time point t2 may be a time point when the garbage collection operation is predicted to be completed.

The invalid page count value at the time point t2 may be the invalid page count value of the stream storage area predicted based on the total write count value indicating the write operation frequency of the stream storage area before the time point t1. In other words, the invalid page count value at the time point t2 may be the corrected invalid page count value described with reference to FIG. 14. The invalid page count value at the time point t2 may be a predicted value without considering a reduction effect of the invalid page count value due to performance of the garbage collection operation.

At the time point t1, it may be more efficient to select the first stream storage area as the target stream storage area. However, at the time point t2 when the garbage collection operation is completed, it may be more efficient to select the second stream storage area as the target stream storage area.

In other words, selecting the second stream storage area that is expected to have a higher invalid page count value at the time point t2 as the target stream storage area at the time point t1 may be more efficient in the garbage collection operation.

According to an embodiment of the present disclosure, the stream storage area predicted to have higher efficiency of the garbage collection operation may be selected as the target stream storage area by using the total write count value indicating the write operation frequency of the stream storage area.

FIG. 16 is a flowchart illustrating an operation of a memory controller according to an embodiment of FIG. 14.

Referring to FIG. 16, in step S1601, the memory controller may calculate an invalid page count value corresponding to the stream storage area. In an example, the invalid page count value corresponding to the stream storage area may be the average value of invalid page count values of the memory blocks included in the stream storage area. In another example, the invalid page count value corresponding to the stream storage area may be the highest value among the invalid page count values of the memory blocks included in the stream storage area.

In step S1603, the memory controller may calculate the corrected invalid page count value by using the invalid page count value of the stream storage area and the total write count value included in the write history information.

In step S1605, the memory controller may select the stream storage area based on the highest corrected invalid page count value among the plurality of stream storage areas of the memory device.

In step S1607, the memory controller may control the memory device to perform the garbage collection operation on the selected stream storage area.

FIG. 17 is a diagram illustrating another embodiment of a memory controller of FIG. 1.

Referring to FIG. 17, the memory controller 1000 is connected to the host Host and the memory device. The memory controller 1000 is configured to access the memory device in response to the request from the host Host. For example, the memory controller 1000 is configured to control write, read, erase, and background operations of the memory device. The memory controller 1000 is configured to provide an interface between the memory device and the host Host. The memory controller 1000 is configured to drive firmware for controlling the memory device.

The memory controller 1000 may include a processor 1010, a memory buffer 1020, an error corrector (ECC) 1030, a host interface 1040, a buffer controller 1050, a memory interface 1060, and a bus 1070.

The bus 1070 may be configured to provide a channel between components of the memory controller 1000.

The processor 1010 may control overall operations of the memory controller 1000 and may perform a logical operation. The processor 1010 may communicate with an external host through the host interface 1040 and communicate with the memory device through the memory interface 1060. In addition, the processor 1010 may communicate with the memory buffer 1020 through the buffer controller 1050. The processor 1010 may control an operation of the storage device using the memory buffer 1020 as an operation memory, a cache memory, or a buffer memory.

The processor 1010 may perform a function of a flash translation layer (FTL). The processor 1010 may convert a logical block address (LBA) provided by the host into a physical block address (PBA) through the flash translation layer (FTL). The flash translation layer (FTL) may receive the logical block address (LBA) and may convert the logical block address (LBA) into the physical block address (PBA) using a mapping table. There are various address mapping methods of the flash translation layer, according to a mapping unit. Representative address mapping methods include a page mapping method, a block mapping method, and a hybrid mapping method.

The processor 1010 is configured to randomize data received from the host Host. For example, the processor 1010 may randomize the data received from the host Host using a randomizing seed. The randomized data is provided to the memory device as data to be stored and is programmed to the memory cell array.

The processor 1010 is configured to de-randomize data received from the memory device during the read operation. For example, the processor 1010 may de-randomize the data received from the memory device using a de-randomizing seed. The de-randomized data may be output to the host Host.

As an embodiment, the processor 1010 may perform the randomization and the de-randomization by driving software or firmware.

The memory buffer 1020 may be used as an operation memory, a cache memory, or a buffer memory of the processor 1010. The memory buffer 1020 may store codes and commands executed by the processor 1010. The memory buffer 1020 may store data processed by the processor 1010. The memory buffer 1020 may include a static RAM (SRAM) or a dynamic RAM (DRAM).

The error corrector 1030 may perform error correction. The error corrector 1030 may perform error correction encoding (ECC encoding) based on data to be written to the memory device through memory interface 1060. The error correction encoded data may be transferred to the memory device through the memory interface 1060. The error corrector 1030 may perform error correction decoding (ECC decoding) on the data received from the memory device through the memory interface 1060. As an example, the error corrector 1030 may be included in the memory interface 1060 as a component of the memory interface 1060.

The host interface 1040 is configured to communicate with an external host under control of the processor 1010. The host interface 1040 may be configured to perform communication using at least one of various communication methods such as a Universal Serial Bus (USB), a Serial AT Attachment (SATA), a Serial Attached SCSI (SAS), a High Speed Interchip (HSIC), a Small Computer System Interface (SCSI), a Peripheral Component Interconnection (PCI express), a Nonvolatile Memory Express (NVMe), a Universal Flash Storage (UFS), a Secure Digital (SD) card, a Multimedia Card (MMC), an embedded MMC (eMMC), a Dual In-line Memory Module (DIMM), a Registered DIMM (RDIMM), and a Load Reduced DIMM (LRDIMM) by way of non-limiting examples.

The buffer controller 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

As an example, the memory controller 1000 does not include the memory buffer 1020 and the buffer controller 1050.

As an example, the processor 1010 may control the operation of the memory controller 1000 using codes. The processor 1010 may load the codes from a non-volatile memory device (for example, a read only memory) provided inside the memory controller 1000. As another example, the processor 1010 may load the codes from the memory device through the memory interface 1060.

As an example, the bus 1070 of the memory controller 1000 may be divided into a control bus and a data bus. The data bus may be configured to transmit data within the memory controller 1000 and the control bus may be configured to transmit control information such as a command and an address within the memory controller 1000. The data bus and the control bus may be separated from each other and may not interfere with each other or affect each other. The data bus may be connected to the host interface 1040, the buffer controller 1050, the error corrector 1030, and the memory interface 1060. The control bus may be connected to the host interface 1040, the processor 1010, the buffer controller 1050, the memory buffer 1202, and the memory interface 1060.

Figure 18:
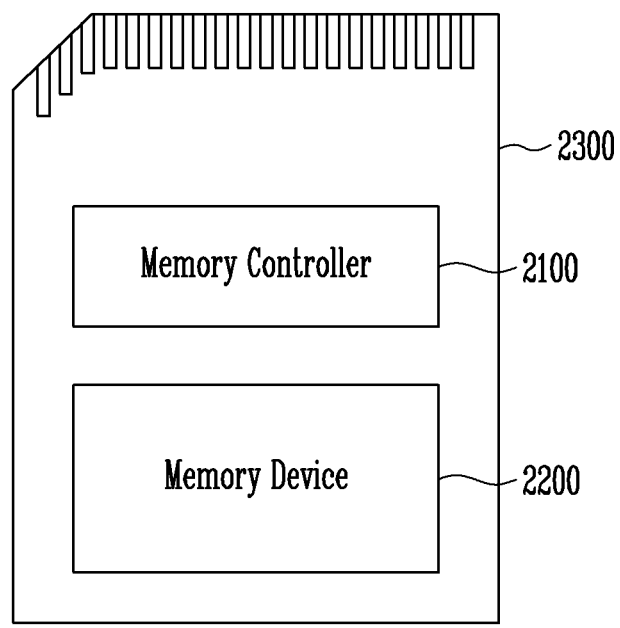
FIG. 18 is a block diagram illustrating a memory card system using a storage device according to an embodiment of the present disclosure.

FIG. 18 is a block diagram illustrating a memory card system using a storage device according to an embodiment of the present disclosure.

Referring to FIG. 18, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 may be configured to control read, write, erase, and background operations of the memory device 2200. The memory controller 2100 is configured to provide an interface between the memory device 2200 and the host Host. The memory controller 2100 is configured to drive firmware for controlling the memory device 2200. The memory controller 2100 may be implemented equally to the memory controller 200 described with reference to FIG. 1.

As an example, the memory controller 2100 may include components such as a random access memory (RAM), a processor, a host interface, a memory interface, and an error corrector.

The memory controller 2100 may communicate with an external device through the connector 2300. The memory controller 2100 may communicate with an external device (for example, the host) according to a specific communication standard. As an example, the memory controller 2100 is configured to communicate with an external device through at least one of various communication standards such as for example a Universal Serial Bus (USB), a Multimedia Card (MMC), an embedded MMC (eMMC), a Peripheral Component Interconnection (PCI), a PCI Express (PCI-E), an Advanced Technology Attachment (ATA), a Serial-ATA, a Parallel-ATA, a Small Computer System Interface (SCSI), an Enhanced Small Disk Interface (ESDI), Integrated Drive Electronics (IDE), FireWire, a Universal Flash Storage (UFS), Wi-Fi, Bluetooth, and an NVMe. As an example, the connector 2300 may be defined by at least one of the various communication standards described above.

As an example, the memory device 2200 may be configured as various non-volatile memory elements such as for example an Electrically Erasable and Programmable ROM (EEPROM), a NAND flash memory, a NOR flash memory, a Phase-change RAM (PRAM), a Resistive RAM (Re-RAM), a Ferroelectric RAM (FRAM), and a Spin-Torque Magnetic RAM (STT-MRAM).

The memory controller 2100 and the memory device 2200 may be integrated into one semiconductor device to configure a memory card. For example, the memory controller 2100 and the memory device 2200 may be integrated into one semiconductor device to configure a memory card such as a PC card (Personal Computer Memory Card International Association (PCMCIA)), a Compact Flash card (CF), a Smart Media card (SM or SMC), a memory stick, a Multimedia Card (MMC, RS-MMC, MMCmicro, or eMMC), an SD card (SD, miniSD, microSD, or SDHC), and a Universal Flash Storage (UFS).

Figure 19:
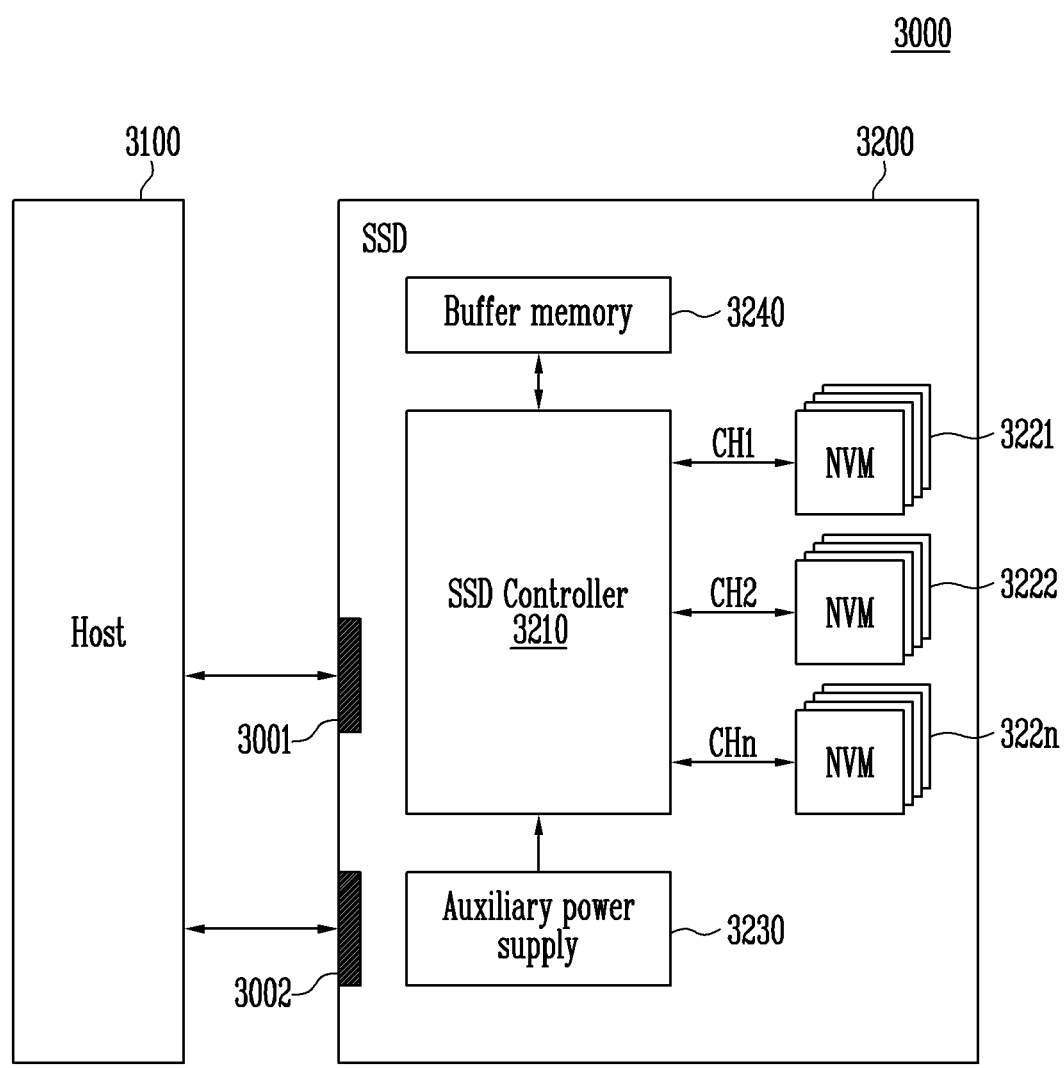
FIG. 19 is a block diagram illustrating a solid state drive (SSD) system using a storage device according to an embodiment of the present disclosure.

FIG. 19 is a block diagram illustrating a solid state drive (SSD) system using a storage device according to an embodiment of the present disclosure.

Referring to FIG. 19, the SSD system 3000 includes a host 3100 and an SSD 3200. The SSD 3200 exchanges a signal SIG with the host 3100 through a signal connector 3001 and receives power PWR through a power connector 3002. The SSD 3200 includes an SSD controller 3210, a plurality of flash memories 3221 to 322n, an auxiliary power device 3230, and a buffer memory 3240.

According to an embodiment of the present disclosure, the SSD controller 3210 may perform the function of the memory controller 200 described with reference to FIG. 1.

The SSD controller 3210 may control the plurality of flash memories 3221 to 322n in response to the signal SIG received from the host 3100. As an example, the signal SIG may be signals based on an interface between the host 3100 and the SSD 3200. For example, the signal SIG may be a signal defined by at least one of interfaces such as a universal serial bus (USB), a multimedia card (MMC), an embedded MMC (eMMC), a peripheral component interconnection (PCI), a PCI express (PCI-E), an advanced technology attachment (ATA), a serial-ATA, a parallel-ATA, a small computer system interface (SCSI), an enhanced small disk interface (ESDI), integrated drive electronics (IDE), FireWire, a universal flash storage (UFS), Wi-Fi, Bluetooth, or an NVMe.

The auxiliary power device 3230 is connected to the host 3100 through the power connector 3002. The auxiliary power device 3230 may receive the power PWR from the host 3100 and may charge the power. The auxiliary power device 3230 may provide power of the SSD 3200 when power supply from the host 3100 is not smooth. As an example, the auxiliary power device 3230 may be positioned in the SSD 3200 or may be positioned outside the SSD 3200. For example, the auxiliary power device 3230 may be positioned on a main board and may provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or may temporarily store metadata (for example, a mapping table) of the flash memories 3221 to 322n. The buffer memory 3240 may include a volatile memory such as a DRAM, an SDRAM, a DDR SDRAM, an LPDDR SDRAM, and a GRAM, or a non-volatile memory such as an FRAM, a ReRAM, an STT-MRAM, and a PRAM for example.

Figure 20:
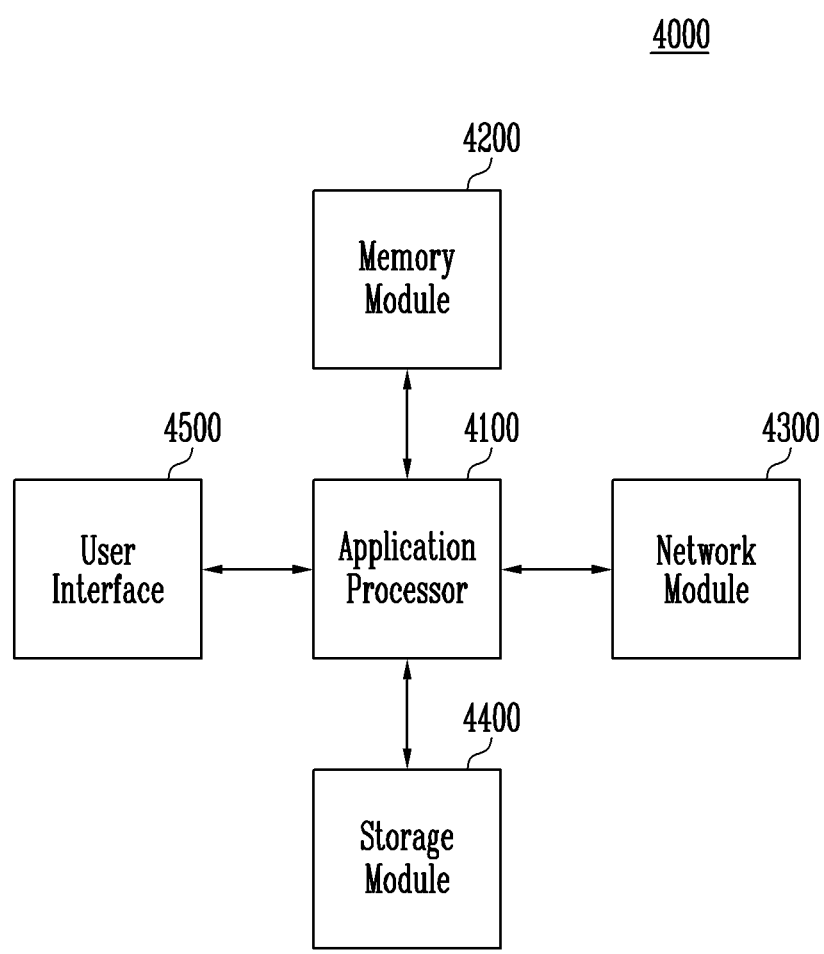
FIG. 20 is a block diagram illustrating a user system using a storage device according to an embodiment of the present disclosure.

FIG. 20 is a block diagram illustrating a user system using a storage device according to an embodiment of the present disclosure.

Referring to FIG. 20, the user system 4000 includes an application processor 4100, a memory module 4200, a network module 4300, a storage module 4400, and a user interface 4500.

The application processor 4100 may drive components, an operating system (OS), a user program, or the like included in the user system 4000. As an example, the application processor 4100 may include controllers, interfaces, graphics engines, and the like that control the components included in the user system 4000. The application processor 4100 may be provided as a system-on-chip (SoC).

The memory module 4200 may operate as a main memory, an operation memory, a buffer memory, or a cache memory of the user system 4000. The memory module 4200 may include a volatile random access memory such as a DRAM, an SDRAM, a DDR SDRAM, a DDR2 SDRAM, a DDR3 SDRAM, an LPDDR SDARM, an LPDDR2 SDRAM, and an LPDDR3 SDRAM, or a non-volatile random access memory, such as a PRAM, a ReRAM, an MRAM, and an FRAM. As an example, the application processor 4100 and memory module 4200 may be packaged based on a package on package (POP) and provided as one semiconductor package.

The network module 4300 may communicate with external devices. As an example, the network module 4300 may support wireless communication such as code division multiple access (CDMA), global system for mobile communications (GSM), wideband CDMA (WCDMA), CDMA-2000, time division multiple access (TDMA), long term evolution, Wimax, WLAN, UWB, Bluetooth, and Wi-Fi. As an example, the network module 4300 may be included in the application processor 4100.

The storage module 4400 may store data. For example, the storage module 4400 may store data received from the application processor 4100. Alternatively, the storage module 4400 may transmit data stored in the storage module 4400 to the application processor 4100. As an example, the storage module 4400 may be implemented as a non-volatile semiconductor memory element such as a phase-change RAM (PRAM), a magnetic RAM (MRAM), a resistive RAM (RRAM), a NAND flash, a NOR flash, and a three-dimensional NAND flash. As an example, the storage module 4400 may be provided as a removable storage device (removable drive), such as a memory card, and an external drive of the user system 4000.

As an example, the storage module 4400 may be operated in the same or substantially same way as the storage device 50 described above with reference to FIG. 1. The storage module 4400 may include a plurality of non-volatile memory devices, and the plurality of non-volatile memory devices may operate equally to or substantially the same as the memory device 100 described with reference to FIG. 1.

The user interface 4500 may include interfaces for inputting data or an instruction to the application processor 4100 or for outputting data to an external device. As an example, the user interface 4500 may include user input interfaces such as a keyboard, a keypad, a button, a touch panel, a touch screen, a touch pad, a touch ball, a camera, a microphone, a gyroscope sensor, a vibration sensor, and a piezoelectric element. The user interface 4500 may include user output interfaces such as a liquid crystal display (LCD), an organic light emitting diode (OLED) display device, an active matrix OLED (AMOLED) display device, an LED, a speaker, and a monitor.

What is claimed is:

1. A memory controller, which controls at least one memory device including a plurality of stream storage areas, the memory controller comprising:
   a buffer configured to store write data;
   a write history manager configured to store write count values for each of the plurality of stream storage areas and to generate write history information indicating a write operation frequency for each of the plurality of stream storage areas based on the write count values;
   a write controller configured to control the at least one memory device to store the write data provided from the buffer; and
   a garbage collection controller configured to calculate a reference count value using an invalid page count value and the write operation frequency for each of the plurality of stream storage areas, select a target stream storage area from among the plurality of stream storage areas based on the reference value, and control the at least one memory device to perform a garbage collection operation on the target stream storage area.

2. The memory controller of claim 1, wherein the write history manager generates the write history information including a total write count value for each of the plurality of stream storage areas by summing the write count values for each of the plurality of stream storage areas.

3. The memory controller of claim 1, wherein the write history manager stores the number of write operations performed in a set period on each of the plurality of stream storage areas as write count information.

4. The memory controller of claim 3, wherein the set period is a time period of a predetermined length.

5. The memory controller of claim 3, wherein the set period is a period of time in which the at least one memory device performs a preset number of write operations.

6. The memory controller of claim 3, wherein, when the number of write count information stored in the write history manager reaches a preset number, the write history manager overwrites an oldest stored write count information with a newly generated write count information.

7. The memory controller of claim 2, wherein the buffer includes a plurality of stream buffer areas respectively corresponding to the plurality of stream storage areas, and
the write controller controls a size of each of the plurality of stream buffer areas based on the write history information.

8. The memory controller of claim 7, wherein each of the plurality of stream buffer areas includes a fixed area and a variable area, and
wherein the write controller controls a size of the variable area of each of the plurality of stream buffer areas based on the write history information.

9. The memory controller of claim 7,
wherein the total write count values of the plurality of stream buffer areas are set to the total write count values of corresponding plurality of stream storage areas, and
wherein the write controller reduces a size of a first stream buffer area from among the plurality of stream buffer areas and increases a size of a second stream buffer area from among the plurality of stream buffer areas when a total write count value of the second stream buffer area is greater than a total write count value of the first stream buffer area.

10. The memory controller of claim 9, wherein the write controller allocates a part of the first stream buffer area to the second stream buffer area.

11. The memory controller of claim 9, wherein the write controller allocates a part of the first stream buffer area to at least one or more stream buffer areas when the total write count value of each of the at least one or more stream buffer areas is less than the total write count value of the first stream buffer area.

12. The memory controller of claim 1, wherein each of the plurality of stream storage areas is a storage area storing the write data corresponding to a stream identifier for each of the plurality of stream storage areas that is received from a host.

13. The memory controller of claim 2, wherein the garbage collection controller calculates the reference count value by summing the invalid page count value to a value obtained by multiplying a correction coefficient by the total write count value.

14. The memory controller of claim 2, wherein the invalid page count value for each of the plurality of stream storage areas is an average value of invalid page count values of a plurality of memory blocks in each stream storage area.

15. The memory controller of claim 2, wherein the invalid page count value for each of the plurality of stream storage areas is a highest value of invalid page count values of a plurality of memory blocks in each stream storage area.

16. The memory controller of claim 2, wherein the garbage collection controller selects at least two victim blocks from among a plurality of memory blocks in the target stream storage area, and controls the at least one memory device to copy valid data stored in the at least two victim blocks to a free block among the plurality memory blocks included in the target stream storage area.

17. The memory controller of claim 1, wherein each of the plurality of stream storage areas includes at least two memory blocks, and
wherein the at least two memory blocks are included in different memory devices among the at least one memory device.

18. A method of operating a memory controller, which controls at least one memory device including a plurality of stream storage areas, the method comprising:
storing a plurality of write count values for each of the plurality of stream storage areas in a set period;
generating write history information indicating a write operation frequency for each of the plurality of stream storage areas based on the plurality of write count values;
calculating a reference count value using an invalid page count value and the write operation frequency for each of the plurality of stream storage areas;
selecting a target stream storage area from among the plurality of stream storage areas based on the reference count value; and
controlling the at least one memory device to perform a garbage collection operation on the target stream storage area.

19. The method of claim 18, further comprising:
controlling a size of each of a plurality of stream buffer areas respectively corresponding to the plurality of stream storage areas using the write history information.

20. The method of claim 18, wherein the set period is any one of a time period of a predetermined length and a period of time in which a preset number of write operations are performed on the plurality of stream storage areas.

* * * * *